United States Patent [19]

Uenishi et al.

[11] Patent Number: 5,144,848

[45] Date of Patent: Sep. 8, 1992

[54] INTRA-TUBE TRAVELING APPARATUS

[75] Inventors: Nobuaki Uenishi, Kodaira; Mitsugu Nagayoshi; Hirofumi Miyanaga, both of Hachioji; Tomoaki Sato, Higashiyamato; Katsunori Sakiyama, Hachioji; Yasuhiro Ueda, Kokubunji; Hideyuki Adachi, Hachioji, all of Japan

[73] Assignee: Olympus Optical Co., Ltd., Tokyo, Japan

[21] Appl. No.: 608,573

[22] Filed: Nov. 2, 1990

[30] Foreign Application Priority Data

Nov. 27, 1989 [JP] Japan ................... 1-307325
Nov. 27, 1989 [JP] Japan ................... 1-307326
Feb. 28, 1990 [JP] Japan ................... 2-47818
Feb. 28, 1990 [JP] Japan ................... 2-47819
Oct. 23, 1990 [JP] Japan ................... 2-283439

[51] Int. Cl.⁵ .................... G02B 23/24; G01M 19/00
[52] U.S. Cl. .................... 73/866.5; 356/241; 358/98
[58] Field of Search ............ 73/866.5, 865.8, 40.5 P; 358/98, 100; 356/241; 385/117, 118, 902

[56] References Cited

U.S. PATENT DOCUMENTS

| 3,381,714 | 5/1968 | Johnson | 73/40.5 PX |
|---|---|---|---|
| 3,453,869 | 7/1969 | Cherne | 73/40.5 P |
| 3,495,546 | 2/1970 | Brown et al. | 73/866.5 X |
| 3,837,214 | 9/1974 | Guest | 73/40.5 P |
| 4,601,204 | 7/1986 | Fournot et al. | 73/866.5 |
| 4,848,168 | 7/1989 | Negishi | 73/865.8 |
| 5,025,215 | 6/1991 | Pirl | 73/866.5 X |

FOREIGN PATENT DOCUMENTS

| 246647 | 11/1986 | Japan | 73/40.5 P |
|---|---|---|---|
| 63-91555 | 4/1988 | Japan | . |
| 193121 | 8/1988 | Japan | 358/98 |
| 204015 | 8/1989 | Japan | 358/98 |
| 241515 | 9/1989 | Japan | 358/98 |

OTHER PUBLICATIONS

*Patent Abstracts of Japan;* Grp P754, vol. 12, No. 329; Abs pub. date Sep. 7, 1988 63-91555).

Primary Examiner—Tom Noland
Attorney, Agent, or Firm—Frishauf, Holtz, Goodman & Woodward

[57] ABSTRACT

An intra-tube traveling apparatus includes a moving unit to which an endoscope is held and which is self-driven to travel in a pipe path, and a movement control section for controlling movement of the moving unit. The moving unit includes an elastic actuator which is extended/contracted in the radial direction and axial directions of the pipe path upon reception of the pressurized fluid, balloons attached to the front and rear ends of the elastic actuator. Each of the balloons is radially expanded/deformed upon reception of the pressurized fluid therein to be locked to the inner surface of the pipe path. The movement control section includes a pressurized fluid supply unit, a switching control section, a stop signal output switch for outputting a stop signal for stopping a movement operation of the moving unit, and a unit fixing portion for supplying the pressurized fluid to the balloons upon reception of the stop signal from the stop signal output switch to expand/deform the lock portions, thereby fixing the moving unit to the inner surface of the pipe path.

24 Claims, 30 Drawing Sheets

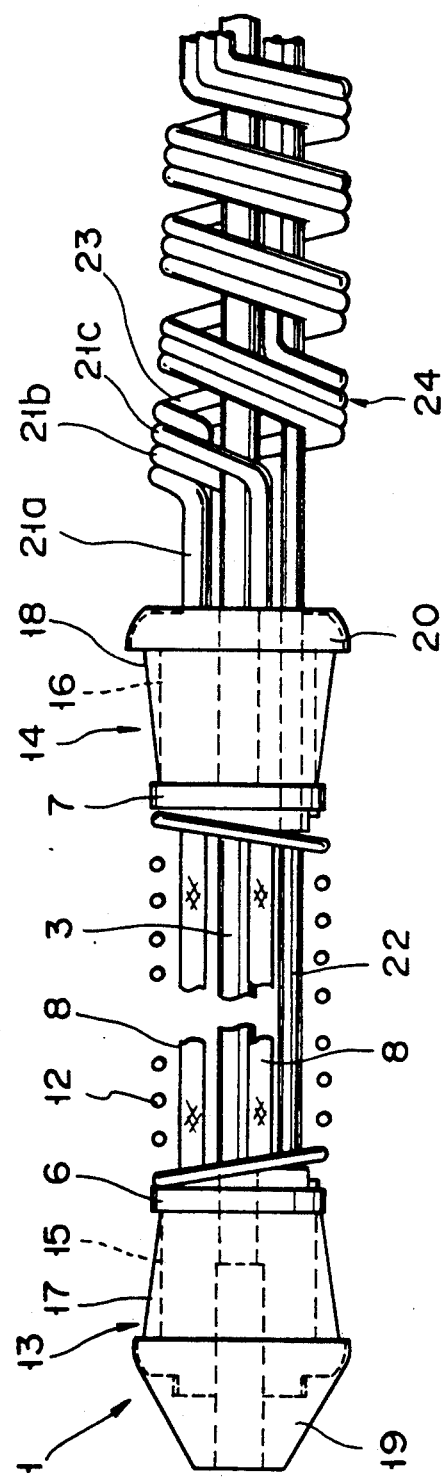
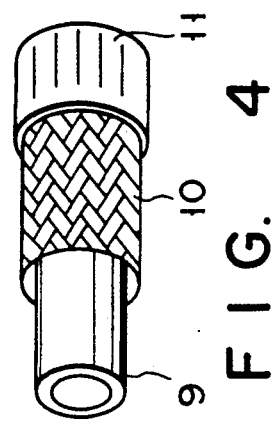
FIG. 3
FIG. 4

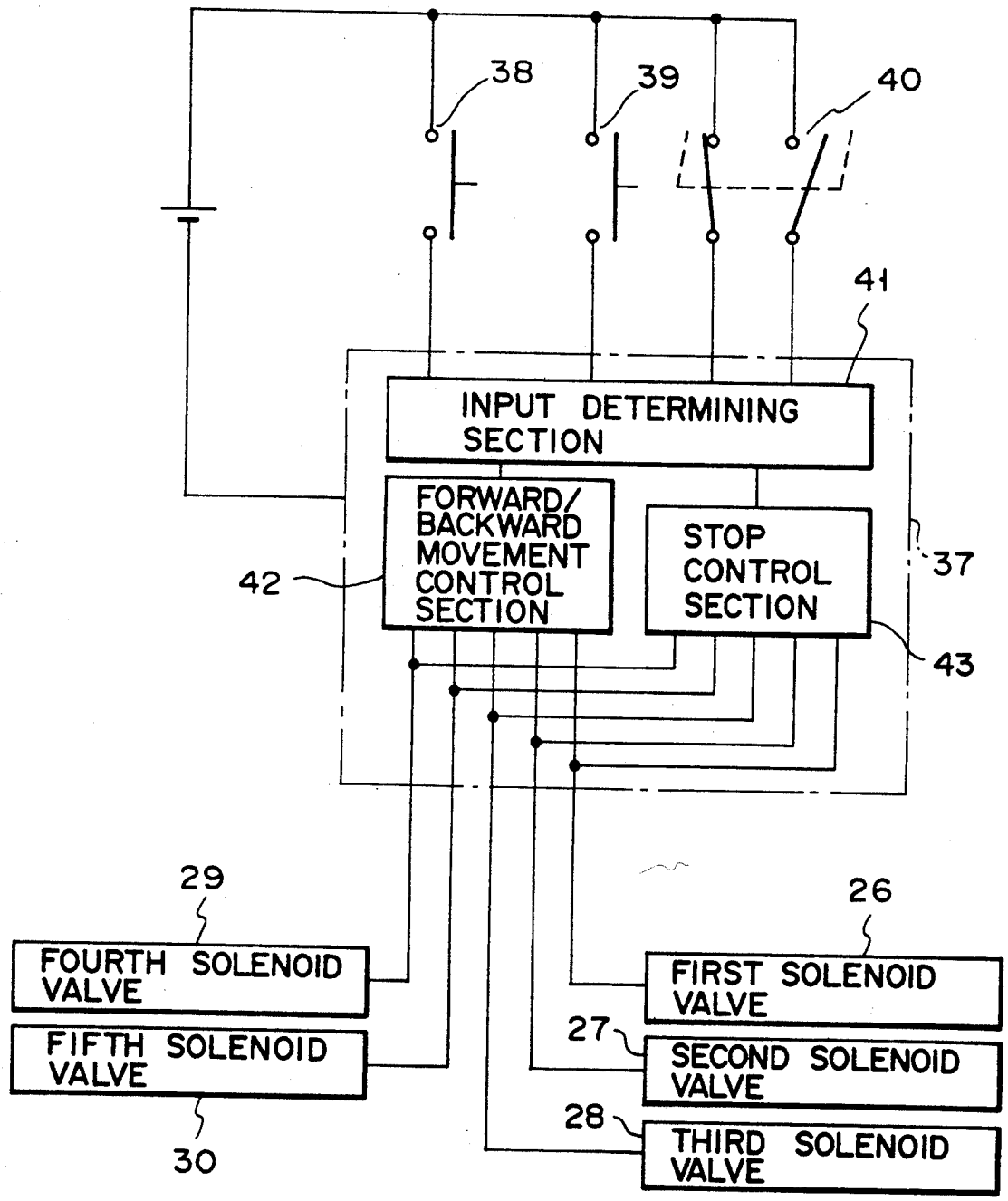
F I G. 10

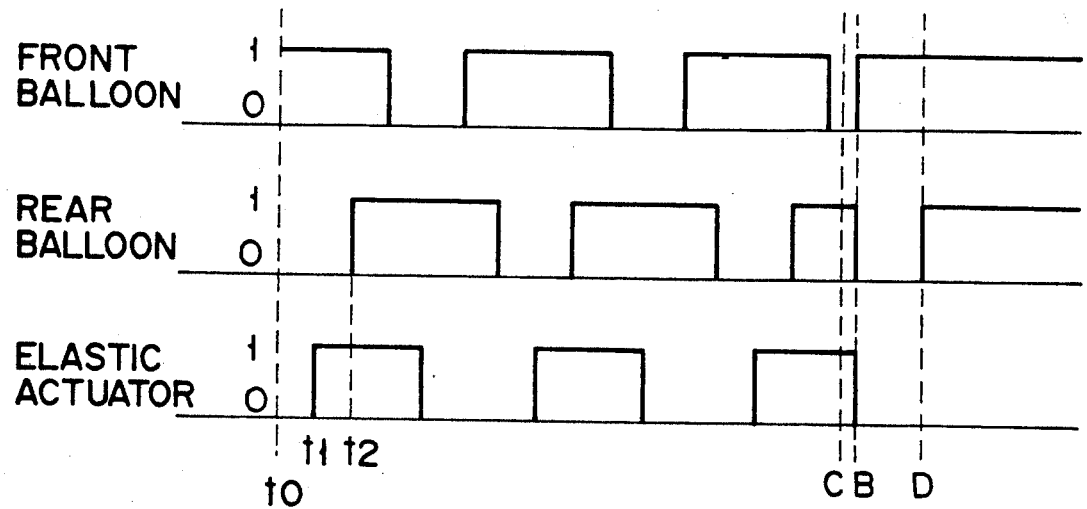
F I G. 14
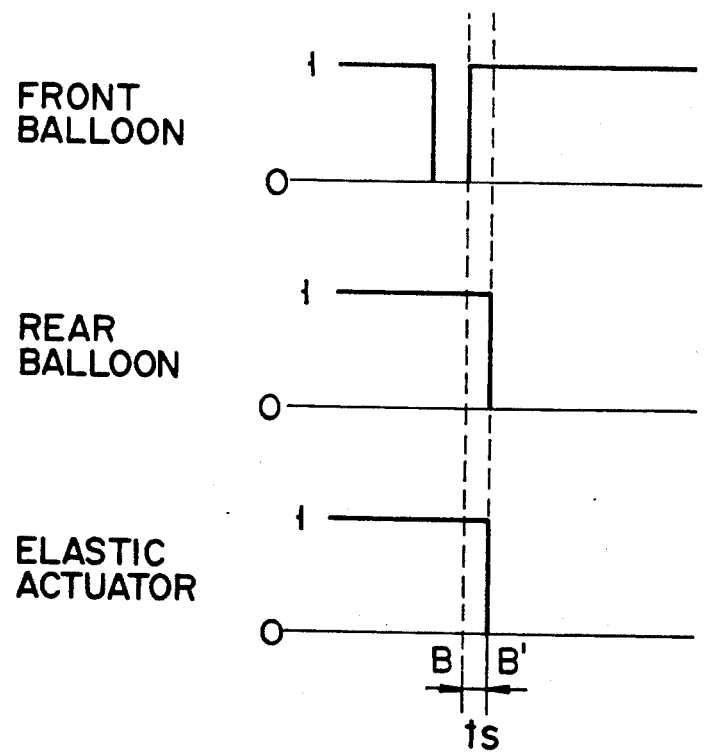
F I G. 15

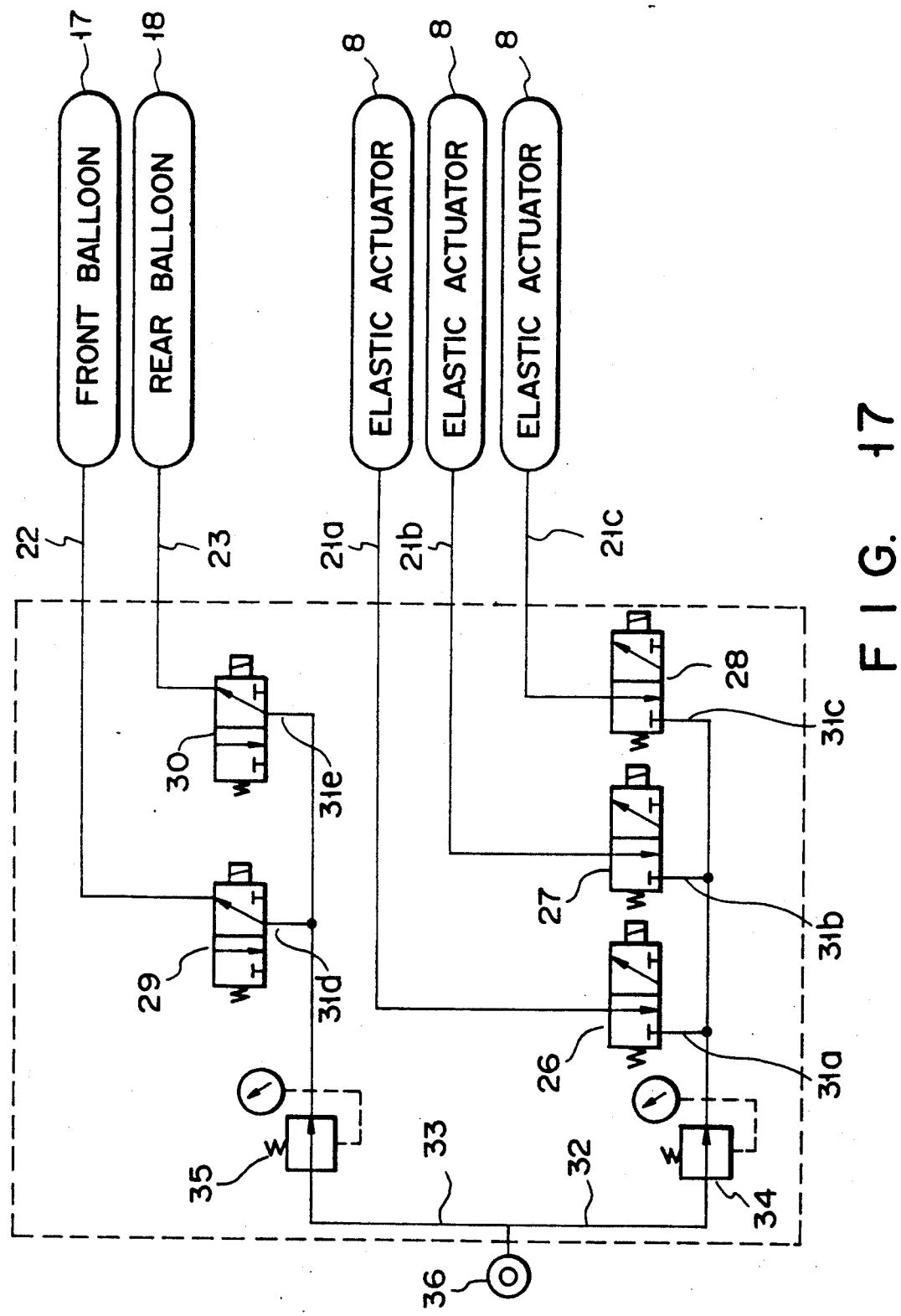
F I G. 17

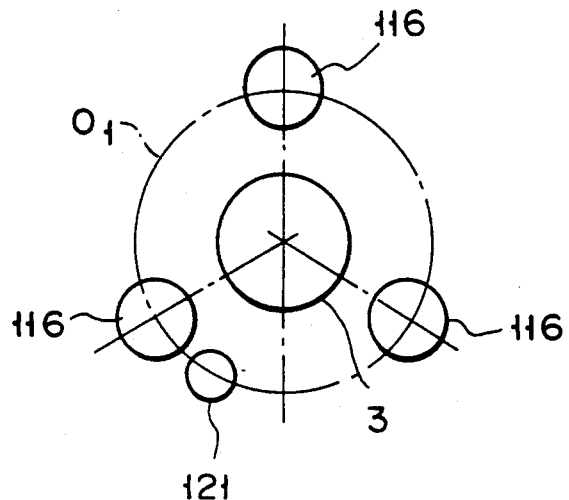
F I G. 29
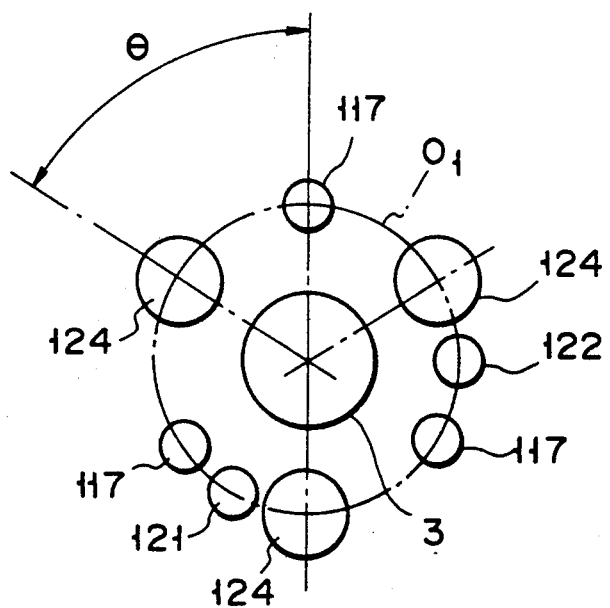
F I G. 30

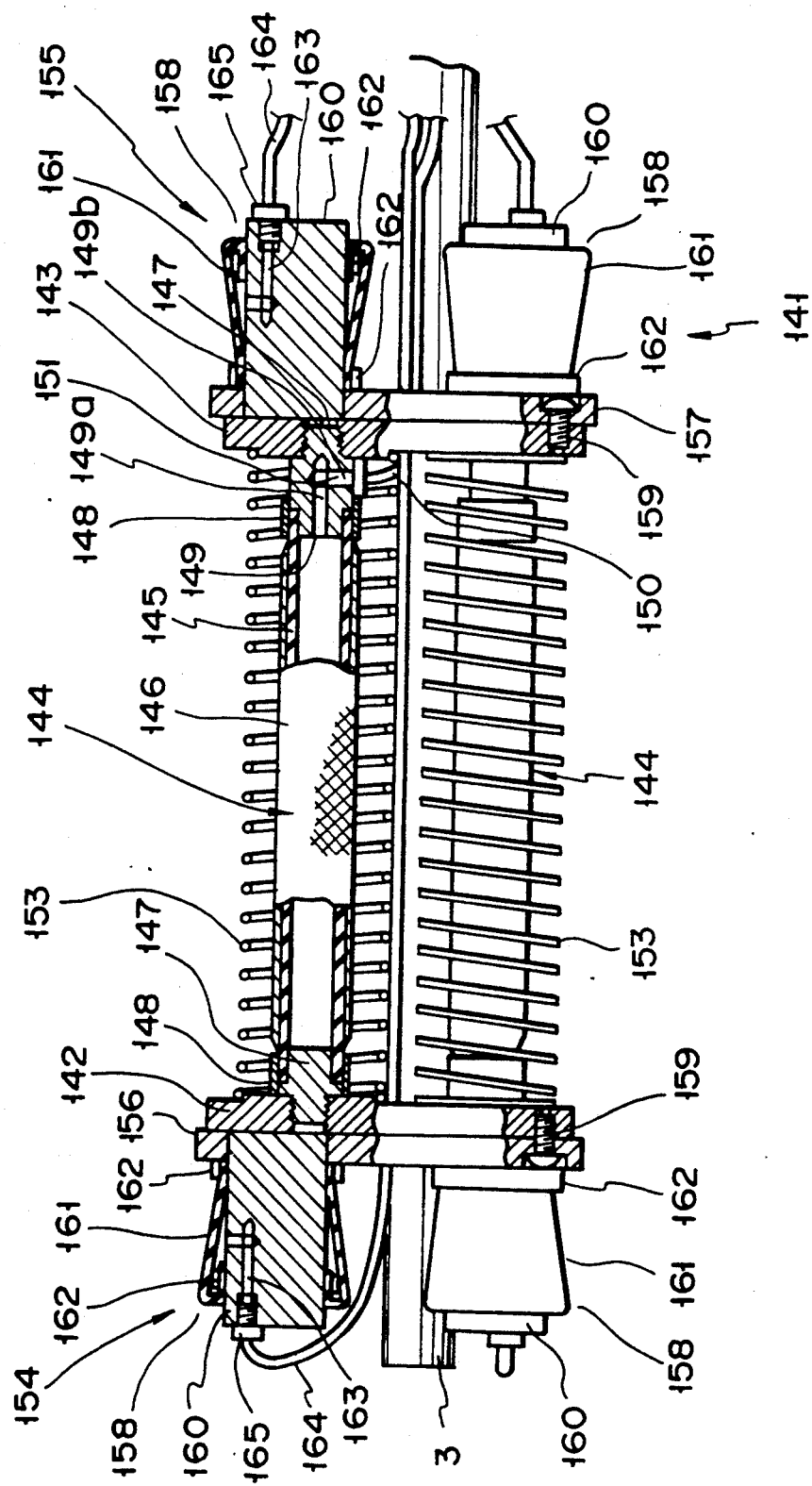
F I G. 31

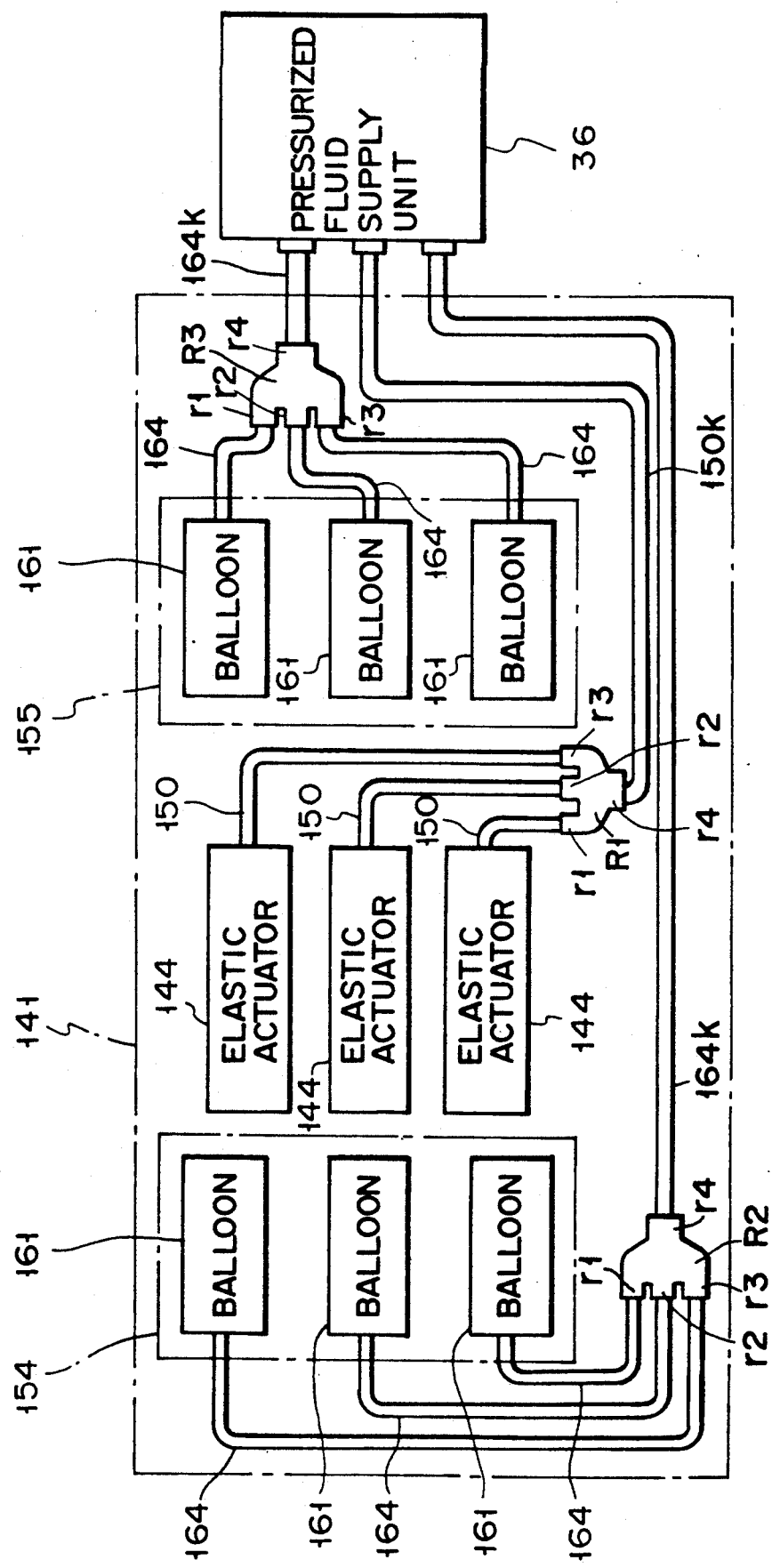
F I G. 39

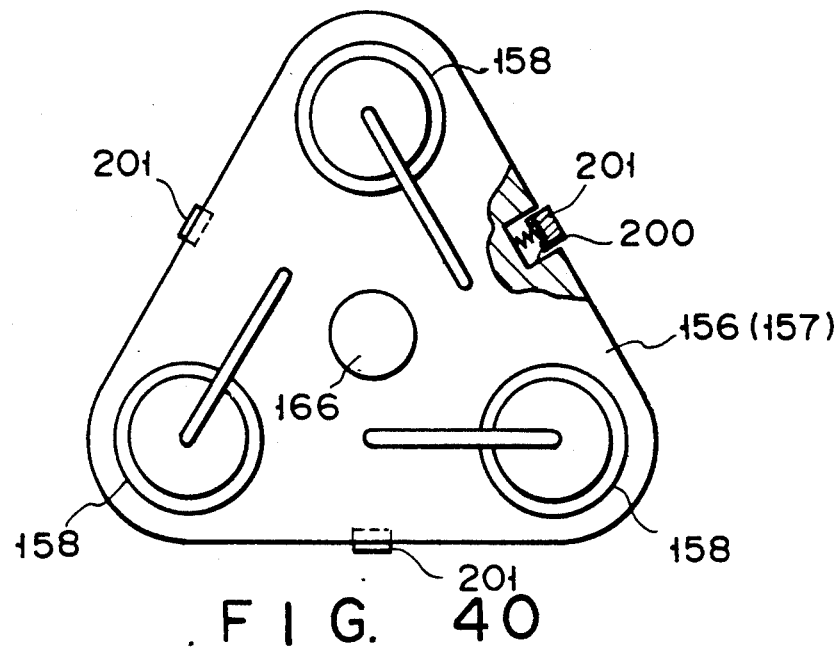
F I G. 40
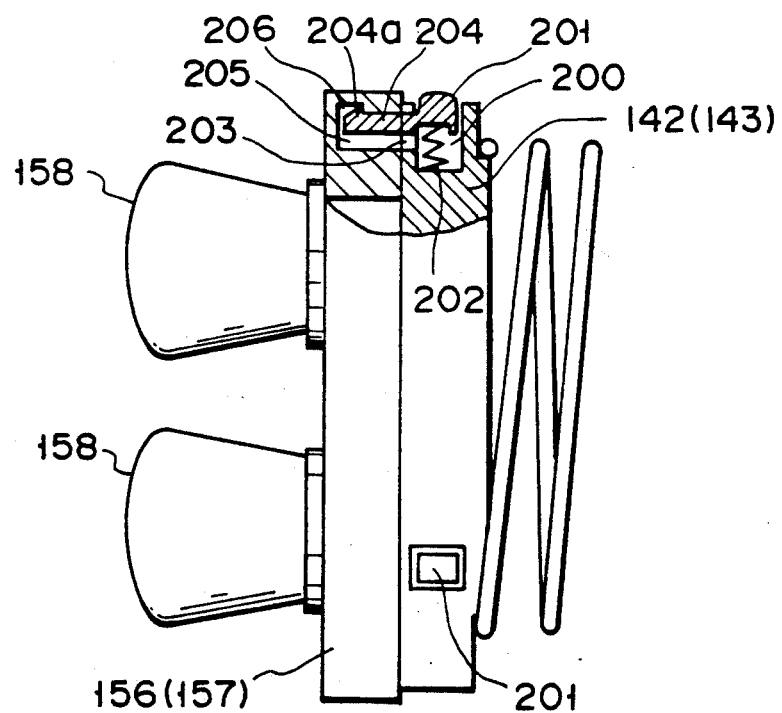
F I G. 41

INTRA-TUBE TRAVELING APPARATUS

BACKGROUND OF THE INVENTION

1. Field of the Invention

The present invention relates to an intra-tube traveling apparatus of an intra-tube test apparatus such as an endoscope, which tests the interior of, e.g., an industrial pipe path or of an organic canal while it is self-driven to travel in the pipe path.

2. Description of the Related Art

As an intra-tube traveling apparatus of this type, an apparatus having an arrangement disclosed in, e.g., Published Unexamined Japanese Patent Application No. 63-91555 has been developed. A moving unit of this intra-tube traveling apparatus has a substantially tubular elastic contraction member which is radially expanded/deformed and axially generates a contracting force upon reception of a pressurized fluid. Attaching members are respectively arranged on the two ends of this elastic contraction member. A spring member is arranged between the attaching members so as to generate a biasing force in a direction opposite to the axial contraction/deformation direction of the elastic contraction member. In addition, balloon-like lock members which are radially expanded/deformed upon reception of a pressurized fluid are respectively attached to the attaching members.

When the intra-tube traveling apparatus is to be used, the moving unit of the intra-tube traveling apparatus is inserted in a pipe path to be tested. In this state, a pressurized fluid is supplied/discharged to/from the elastic contraction member in accordance with alternate supply and discharge of the pressurized fluid to/from the respective lock members in the following manner, thus performing a forward or backward movement operation of the moving unit.

More specifically, when the moving unit of the intra-tube traveling apparatus is to be moved forward, the pressurized fluid is supplied to the lock member on the front side first to expand/deform it in the radial direction, thus urging the lock member against the inner surface of a pipe path in which the moving unit is inserted and locking it thereto.

While this state is held, the pressurized fluid is supplied to the elastic contraction member to expand/deform it in the radial direction and to simultaneously contract it in the axial direction, thereby moving the attaching member on the rear side forward upon expansion/deformation of the elastic contraction member.

Subsequently, while the lock member on the front side and the elastic contraction member are kept radially expanded/deformed, the pressurized fluid is supplied to the lock member on the rear side to expand/deform it in the radial direction, thus urging it against the inner surface of the pipe path in which the moving unit is inserted and locking it thereto.

In this state, the pressurized fluid is discharged from the lock member on the front side and from the elastic contraction member to elastically restore the elastic contraction member to the original shape with the aid of the biasing force of the spring member, thereby moving the attaching member on the front side forward.

By repeating this series of operations, a forward movement operation of the moving unit of the intra-tube traveling apparatus is performed.

When the moving unit of the intra-tube traveling apparatus is to be moved backward, the pressurized fluid is supplied to the lock member on the rear side first to expand/deform it in the radial direction, thus urging it against the inner surface of the pipe path in which the moving unit is inserted and locking it thereto.

Subsequently, the pressurized fluid is supplied to the elastic contraction member to expand/deform it in the radial direction. Upon expansion/deformation of the elastic contraction member, the attaching member on the front side is moved backward.

In this state, the pressurized fluid is supplied to the lock member on the front side to expand/deform it in the radial direction, thus urging it against the inner surface of the pipe path in which the moving unit is inserted and locking it thereto.

After this operation, the pressurized fluid is discharged from the lock member on the rear side and from the elastic contraction member to elastically restore the elastic contraction member to the original shape with the aid of the biasing force of the spring member, thus moving the attaching member on the rear side backward.

By repeating this series of operations, a backward movement operation of the moving unit of the intra-tube traveling apparatus is performed.

In the above-described conventional arrangement, a series of operations for forward or backward movement of the moving unit is performed by sequentially supplying/discharging a pressurized fluid to the respective lock members and the elastic contraction member of the moving unit of the intra-tube traveling apparatus at proper timings. However, the moving unit cannot be stopped at an arbitrary position in the process of forward or backward movement of the moving unit. When a stop operation of the moving unit is performed in the process of forward or backward movement of the moving unit in order to perform detailed observation of, e.g., a corroded portion of a pipe wall or a similar operation, the pressurized fluid may be unintentionally discharged from the lock members to release the lock.

Especially, in a vertical pipe path, the apparatus may drop. Therefore, observation must be performed without stopping the moving unit.

SUMMARY OF THE INVENTION

It is an object of the present invention to provide an intra-tube traveling apparatus which can stably hold a moving unit during a movement stop operation of the moving unit, and can freely and stably stop the moving unit in the process of a movement operation even if the moving unit is to travel in a vertical pipe path.

According to the present invention, there is provided an intra-tube traveling apparatus comprising a moving unit to which test means for testing the interior of a pipe path is held and which is self-driven to travel along the pipe path, and movement control means for controlling movement of the moving unit, the moving unit including elastic actuator means which is elastically deformed in the radial direction of the pipe path and is simultaneously extended/contracted in the axial direction of the pipe path upon reception of a pressurized fluid, and lock means respectively attached to the two ends of the elastic actuator means and having balloon-like elastic members, each of the lock means being radially expanded/deformed upon reception of the pressurized fluid therein so as to be locked to an inner surface of the pipe path, and the movement control means including pressurized fluid supply means for supplying the pressurized fluid to the lock means and the elastic actuator means of the moving unit, switching control means for switching/controlling a supply state of the pressurized fluid from the pressurized fluid supply means to the lock means and the elastic actuator means, and a discharge state of the pressurized fluid from the lock means and the elastic actuator means, and causing the moving unit to move forward or backward by supplying/discharging the pressurized fluid to/from the elastic actuator means in accordance with alternate supply and discharge of the pressurized fluid to/from the lock means, stop signal output means, connected to the switching control means, for outputting a stop signal for stopping a movement operation of the moving unit, and unit fixing means for supplying the pressurized fluid to at least one of the lock means upon reception of the stop signal from the stop signal output means so as to expand/deform the lock means, thereby fixing the moving unit to the inner surface of the pipe path.

When a stop signal for stopping a movement operation of the moving unit is output in the process of movement of the moving unit, the pressurized fluid is supplied to at least one of the lock portions of the moving unit by the moving unit fixing means to inflate it and to fix it at an arbitrary position on the inner surface of the pipe path. With this operation, the moving unit can be stably held during a stop movement operation of the moving unit. Even if the moving unit is to travel in a vertical pipe path, movement of the moving unit can be freely and stably stopped in the process of movement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a side view of the moving unit;

FIG. 4 is a perspective view showing a schematic arrangement of an elastic actuator;

FIG. 10 is a schematic diagram showing a control circuit of the moving unit;

FIG. 14 is a timing chart showing operating states of the elastic actuator, and front and rear balloons;

FIG. 15 is a timing chart showing an operating state of a stop switch during an ON period;

FIG. 17 is a schematic diagram showing a state wherein pressurized air is supplied while the moving unit remains stationary;

FIG. 29 is a sectional view taken along a line IIXIX—IIXIX in FIG. 28;

FIG. 30 is a sectional view taken along a line IIIX—IIIX in FIG. 28;

FIG. 31 is a partially sectional side view showing a main part of a moving unit according to the seventh embodiment of the present invention;

FIG. 39 is a schematic view showing the eleventh embodiment of the present invention;

FIG. 40 is a longitudinal sectional view showing a main part of an apparatus according to the twelfth embodiment of the present invention; and FIG. 41 is a partially sectional side view showing a connecting mechanism of a lock unit.

DETAILED DESCRIPTION OF THE PREFERRED EMBODIMENTS

The first embodiment of the present invention will be described below with reference to FIGS. 1 to 17.

Figure 1:
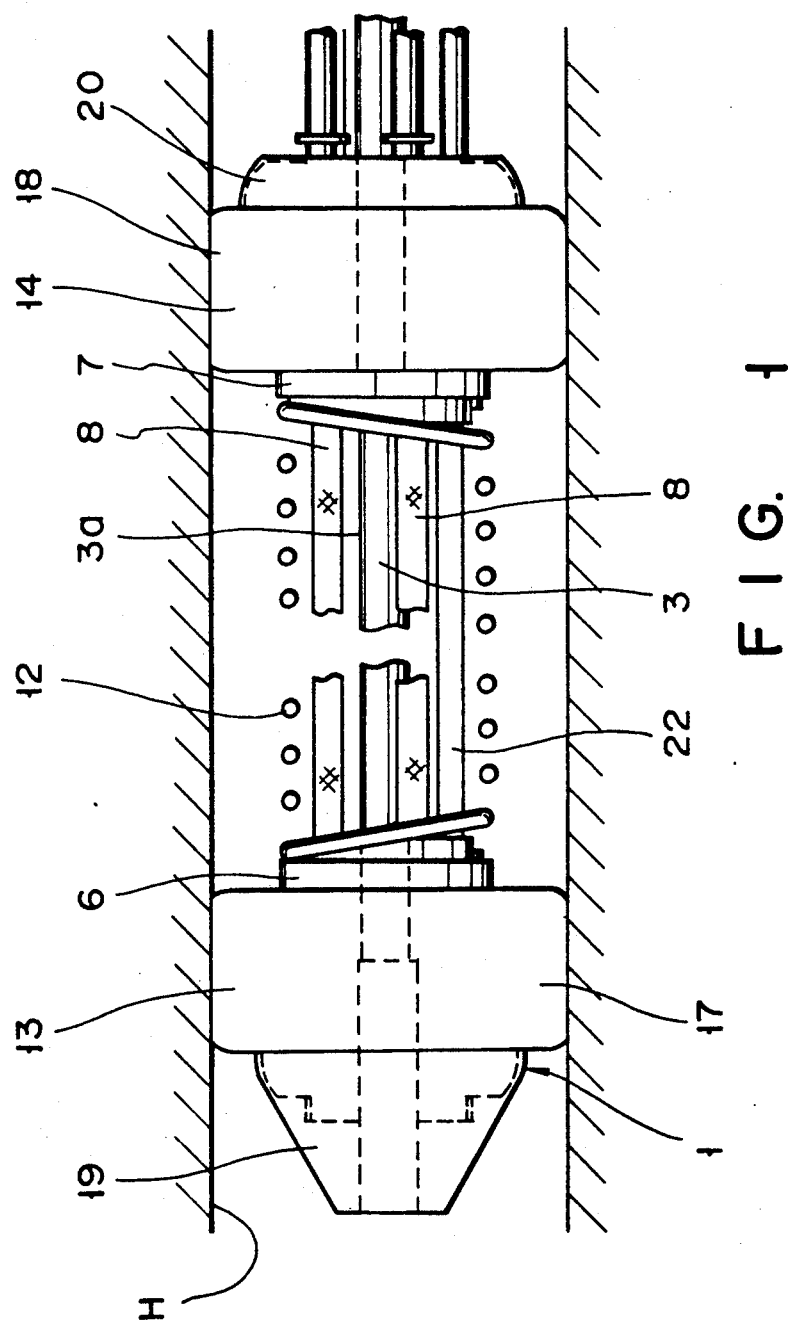
FIG. 1 is a side view showing a stationary state of a moving unit according to the first embodiment of the present invention.
Figure 2A:
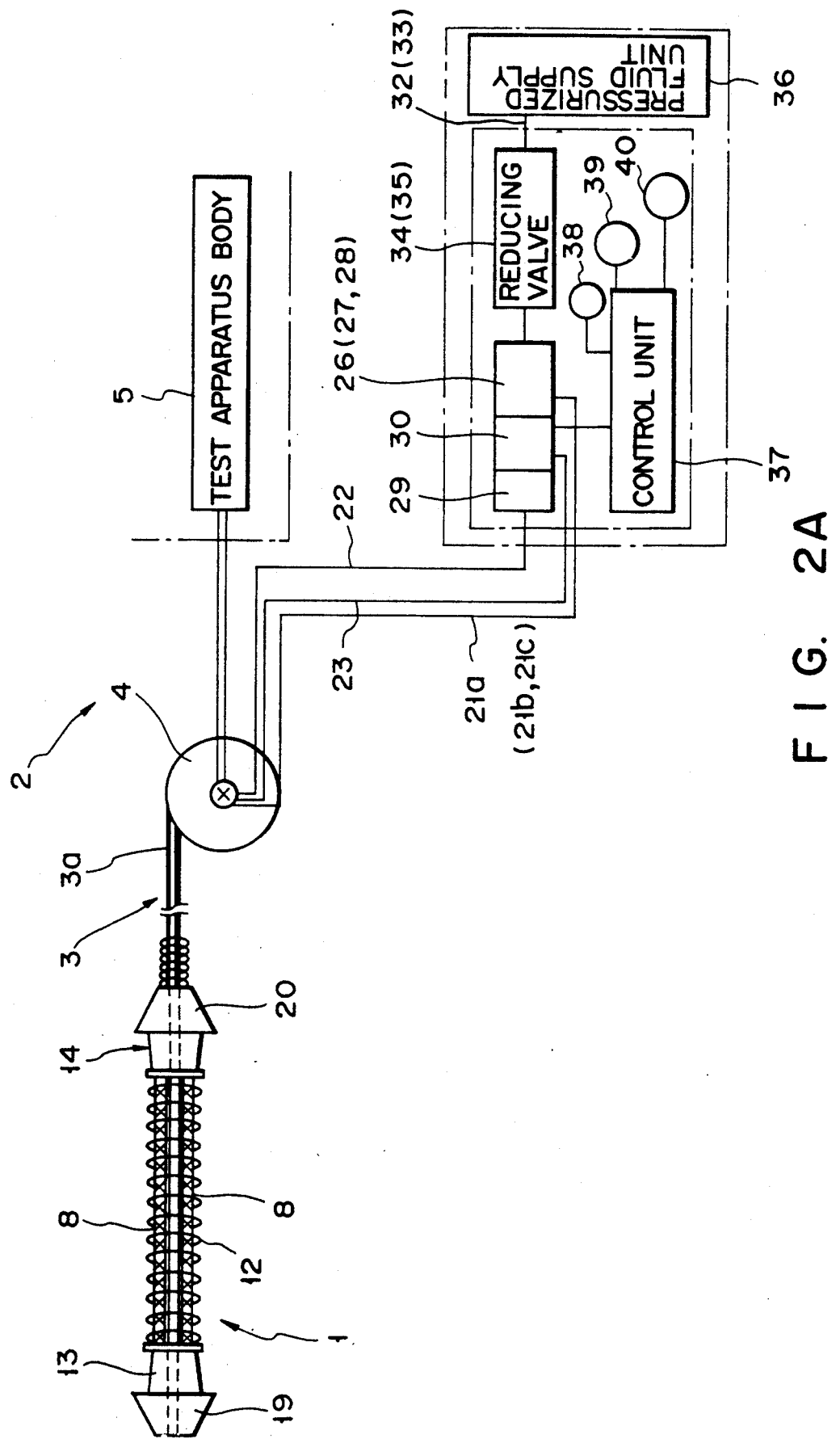
FIG. 2A is a schematic view showing an arrangement of an overall intra-tube self-driven test apparatus.
Figure 2B:
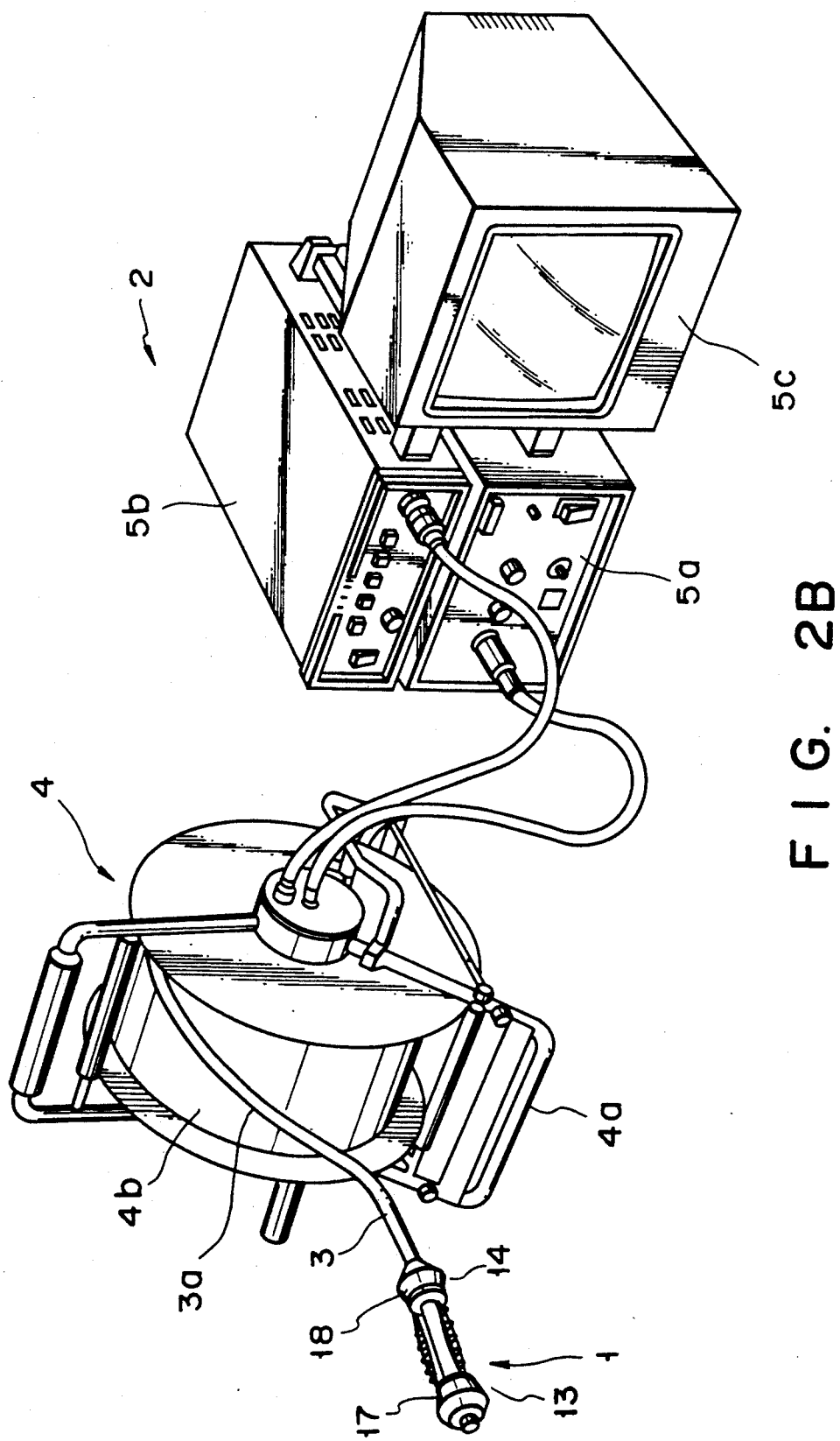
FIG. 2B is a perspective view showing an outer appearance of the intra-tube self-driven test apparatus.

FIG. 1 shows a schematic arrangement of a moving unit 1 of an intra-tube traveling apparatus of the present invention. FIG. 2A shows a schematic arrangement of an intra-tube self-driven test apparatus 2 using the moving unit 1. FIG. 2B shows the outer appearance of the intra-tube self-driven test apparatus 2. The intra-tube self-driven test apparatus 2 includes an endoscope 3. The moving unit 1 is attached to the distal end portion of an inserting portion 3a of the endoscope 3.

In addition, the intra-tube self-driven test apparatus 2 includes a drum unit 4 for taking up the endoscope 3. The drum unit 4 includes a support member 4a and a take-up drum 4b rotatably supported by the support member 4a. The proximal end side portion of the inserting portion 3a of the long endoscope 3 is releasably wound around the take-up drum 4b.

A main body 5 of the intra-tube self-driven test apparatus 2 comprises a light source 5a, a video processor 5b, a TV monitor 5c, and the like. An illumination lens and an objective lens (neither of them are shown) are attached to the distal end portion of the endoscope 3. The distal end face of a light guide fiber arranged in the inserting portion 3a of the endscope 3 is arranged to oppose the inner surface of the illumination lens. A solid-state imaging element (e.g., a CCD) is arranged to oppose the inner surface of the objective lens. Illumination light emitted from the light source 5a is guided to the distal end portion of the endoscope and is radiated outward from the illumination lens. An observation image focused by the objective lens is converted into an electrical signal by the solid-state imaging element. The electrical signal is then input to the video processor 5b and is converted into an image signal to be displayed on the TV monitor 5c.

In addition, as shown in FIG. 3, the moving unit 1 includes a pair of frames 6 and 7 separated and arranged to oppose each other in the axial direction of the moving unit 1. Three contraction type elastic actuators 8 each having a substantially cylindrical shape are arranged to be substantially parallel to the axial direction of the moving unit 1. The two end portions of each of the elastic actuators are respectively connected to the inner surfaces of the frames 6 and 7 in such a manner that the end portions are arranged at equal angular intervals on the same circumference.

Each elastic actuator 8 includes a tubular member 9 consisting of an elastic material such as rubber, as shown in FIG. 4. This tubular member 9 is covered with a braided reinforcing structure 10 which is preferably constituted by a high-tensile fiber or the like so as to have a substantially tubular shape. The openings at the two ends of the integral structure constituted by the tubular member 9 and the braided reinforcing structure are sealed by seal members 11. Each elastic actuator 8 is elastically deformed to radially expand upon supply of a pressurized fluid into the tubular member 9, thereby generating a contracting force in the axial direction.

One compression spring (biasing member) 12 is arranged between the frames 6 and 7 of the moving unit 1 so as to generate a biasing force in a direction opposite to the axial contraction/deformation direction of each elastic actuator 8. The two end portions of the compression spring 12 are respectively fixed to the inner surfaces of the frames 6 and 7. The three elastic actuators 8 are arranged within the coil of the compression coil spring 12.

Lock units 13 and 14 are respectively arranged at the front and rear end portions of the moving unit 1. In this case, connecting portions 15 and 16 each having a substantially cylindrical shape are provided to the front and rear frames 6 and 7, respectively, so as to extend in the forward and backward directions of the moving unit 1. Balloons (lock portions) 17 and 18 each having a substantially cylindrical shape are fitted on the connecting portions 15 and 16 so as to be radially expanded/deformed. That is, the lock units 13 and 14 are designed such that the balloons 17 and 18 are expanded/deformed by supplying a pressurized fluid therein so as to be locked in tight contact with the inner surface of a pipe path H to be tested.

Hard members 19 and 20 are respectively arranged on the outer end portions of the connecting portions 15 and 16. The outer diameters of the hard members 19 and 20 are set to be larger than those of the deflated balloons 17 and 18 and to be smaller than those of the inflated balloons 17 and 18. Note that insertion holes for the endoscope 3 are respectively formed in the central portions of the frames 6 and 7 of the moving unit 1 and of the hard members 19 and 20. While the distal end portion of the endoscope 3 is inserted in the insertion holes of the frames 6 and 7 and of the hard members 19 and 20, for example, the connection portion 15 of the front frame 6 and the endoscope 3 are mechanically fixed to each other through a proper means.

The distal end portions of air tubes 21a, 21b, 21c, 22, and 23 for supplying a pressurized fluid are respectively connected to the three elastic actuators 8, and the front and rear balloons 17 and 18. The distal end portion of the air tube 22 for the front balloon 17 extends toward the front frame 6 through a communicating hole formed in the connecting portion 16 of the rear frame 7 so as to be connected to one end of a communicating hole formed in the frame 6. The other end of this communicating hole communicates with the interior of the front balloon 17.

In addition, the distal end portions of the air tubes 21a, 21b, and 21c for the elastic actuators 8 and of the air tube 23 for the rear balloon 18 are respectively connected to the elastic actuators 8 and the rear balloon 18 through the communicating hole formed in the connecting portion 16 of the rear frame 7.

Furthermore, portions of the air tube 23 for the rear balloon 18 and of the air tubes 21a, 21b, and 21c for the elastic actuators 8 are integrally wound around the inserting portion 3a of the endoscope 3 after the moving unit 1 with a predetermined gap left therebetween to be formed into a substantially coil-like winding portion 24 having a predetermined length. In this case, the portion of the air tube 22 for the front balloon 17 which is located after the moving unit 1 is held in a substantially linear state. The air tube 22 is arranged to be inserted in the winding portion 24 together with the inserting portion 3a of the endoscope 3.

Figure 5:
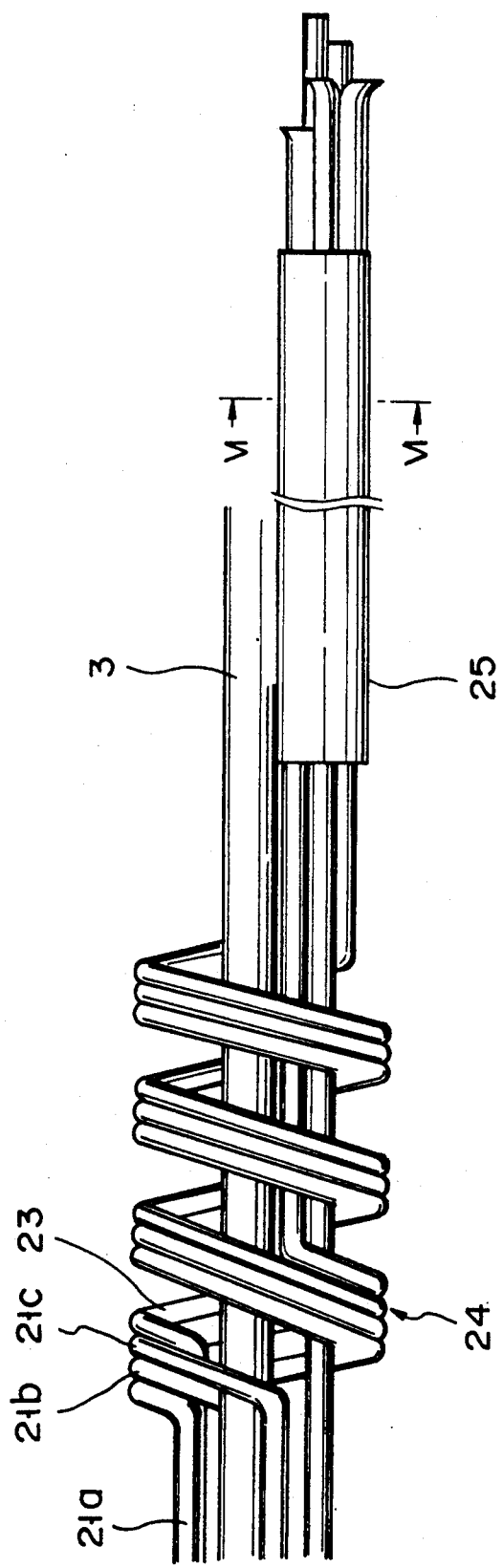
FIG. 5 is a side view showing an arrangement of the respective air tubes of the moving unit.
Figure 6:
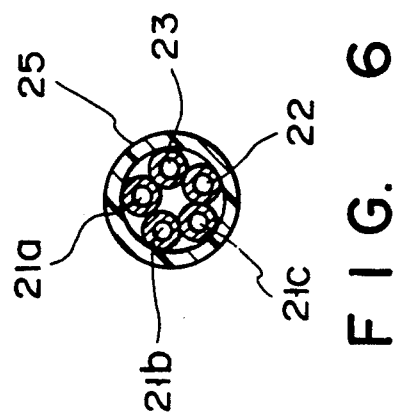
FIG. 6 is a sectional view taken along a line VI—VI in FIG. 5.
Figure 7:
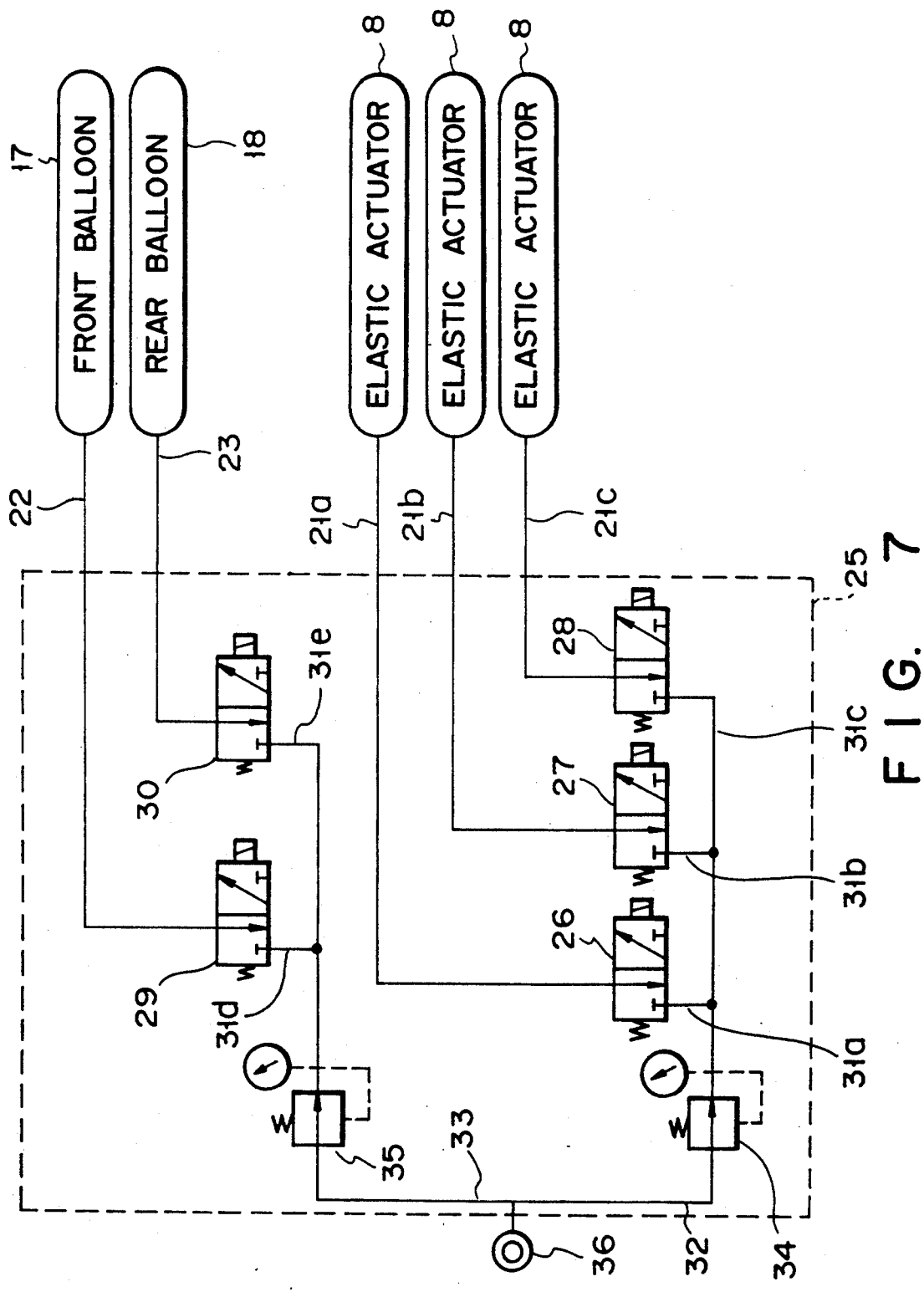
FIG. 7 is a schematic diagram showing an arrangement of a pressurized air supply path switching control section of the respective air paths of the moving unit.

The proximal end portions of the air tubes 21a, 21b, 21c, 22, and 23 for the three elastic actuators 8 and the front and rear balloons 17 and 18 are bundled up at the end position of the winding portion, as shown in FIG. 5. The bundle of the tubes is covered with a protective tube 25, as shown in FIG. 6. The proximal end portions of the air tubes 21a, 21b, 21c, 22, and 23 are respectively connected to first, second, and third solenoid valves 26, 27, and 28 for the elastic actuators 8 in the pressurized air path switching control section 25 and to fourth and fifth solenoid valves 29 and 30 for the front and rear balloons 17 and 18, as shown in FIG. 7.

Figure 8:
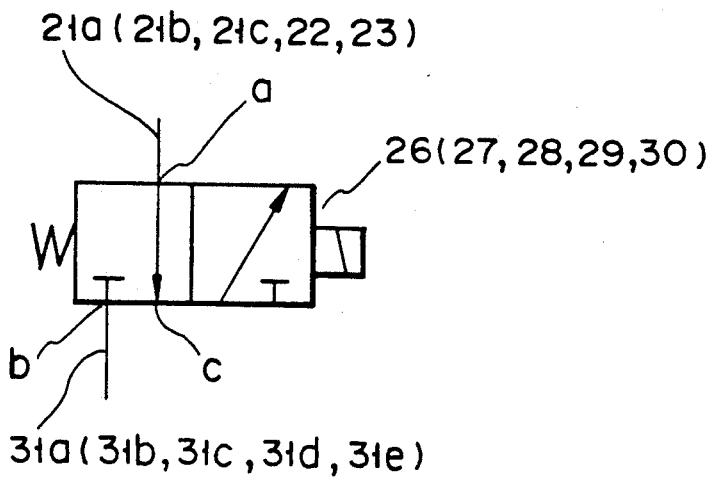
FIG. 8 is a schematic view showing the first switching position of each solenoid valve.
Figure 9:
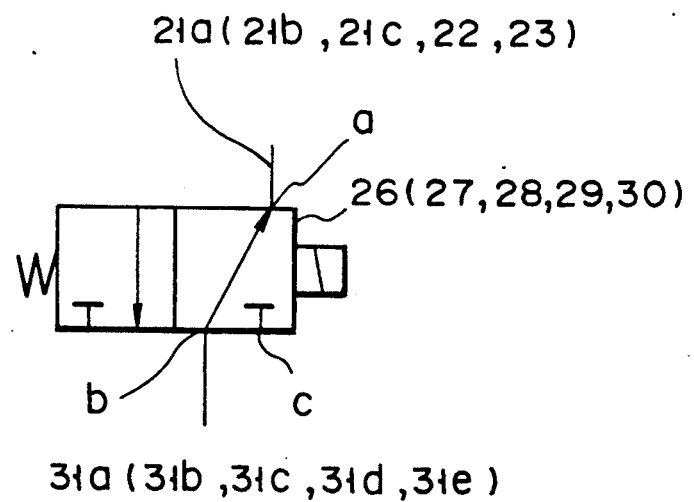
FIG. 9 is a schematic view showing the second switching position of each solenoid valve.

FIG. 8 shows an example of the first and fifth solenoid valves 26 to 30. First to third ports a, b, and c are provided to each of the first to fifth solenoid valves 26 to 30. Each of the first to fifth solenoid valves 26 to 30 is constituted by a two-position three-port solenoid valve which can be switched to two positions, i.e., the first position where the first and third ports a and c are connected to each other while the first and second ports a and b are disconnected from each other as shown in FIG. 8, and the second position where the first and second ports a and b are connected to each other while the first and third ports a and c are disconnected from each other as shown in FIG. 9.

The proximal end portions of the air tubes 21a, 21b, 21c, 22, and 23 are respectively connected to the first ports a of the first to fifth solenoid valves 26 to 30. One end portion of each of branch pipes 31a, 31b, 31c, 31d, and 31e for supplying a pressurized fluid is connected to a corresponding one of the second ports b of the first to fifth solenoid valves 26 to 30. In this case, the other end portion of each of the branch pipes 31a, 31b, and 31c is connected to one common connecting pipe 32. The other end portion of each of the branch pipes 31d and 31e is connected to the other common pipe 33. Reducing valves 34 and 35 are respectively inserted in the connecting pipes 32 and 33 so as to hold a pressurized fluid therein at a predetermined pressure. The distal end portions of the connecting pipes 32 and 33 are connected to a pressurized fluid supply unit (pressurized fluid supply means) 36. The third ports c of the first to fifth solenoid valves 26 to 30 are open to the atmosphere.

FIG. 10 shows a control circuit of the moving unit 1. Reference numeral 37 denotes a control unit. A start switch 38, a stop switch (stop signal output portion) 39, and a forward/backward movement switch 40 are connected to the control unit 37. The stop switch 39 outputs a stop signal for stopping the movement of the moving unit 1 during its movement. The forward/backward movement switch 40 outputs a switch signal for switching the moving direction of the moving unit 1 between the forward and backward directions during a moving operation of the moving unit 1.

The first to fifth solenoid valves 26 to 30 are connected to the control unit 37. Switching operations of the first to fifth solenoid valves 26 to 30 are controlled by control signals output from the control unit 37.

The control unit 37 comprises an input determining section 41, a forward/backward movement control section (movement control means) 42, and a stop control section (moving unit body stopping means) 43. The input determining section 41 serves to determine operating states of the start switch 38, the stop switch 39, and the forward/backward movement switch 40.

The forward/backward movement control section 42 controls operations of the first to fifth solenoid valves 26 to 30 on the basis of a determination result from the input determining section 41 while the start switch 38 and the forward/backward movement switch 40 are operated. A supply operation of a pressurized fluid from the pressurized fluid supply unit 36 to each of the balloons 17 and 18 and to the elastic actuators 8 and a discharge operation of the pressurized fluid therefrom are controlled to be switched by the forward/backward movement control section 42. With this control, the pressurized fluid is supplied/discharged to/from the elastic actuators 8 in accordance with alternate supply/discharge of the pressurized fluid to/from the respective balloons 17 and 18, thus controlling the forward/backward movement of the moving unit 1.

The stop control section 43 controls operations of the first to fifth solenoid valves 26 to 30 on the basis of a determination result from the input determining section 41 while the stop switch 39 is operated. More specifically, when the stop switch 39 is turned on to output a stop signal for stopping the movement of the moving unit 1 while it is moved, the stop signal is input to the stop control section 43. As a result, a pressurized fluid is supplied from the stop control section 43 to the two balloons 17 and 18 so as to radially expand/deform the balloons 17 and 18 and to stop the moving unit 1 in tight contact with the inner surface of the pipe path H to be tested.

Figure 11:
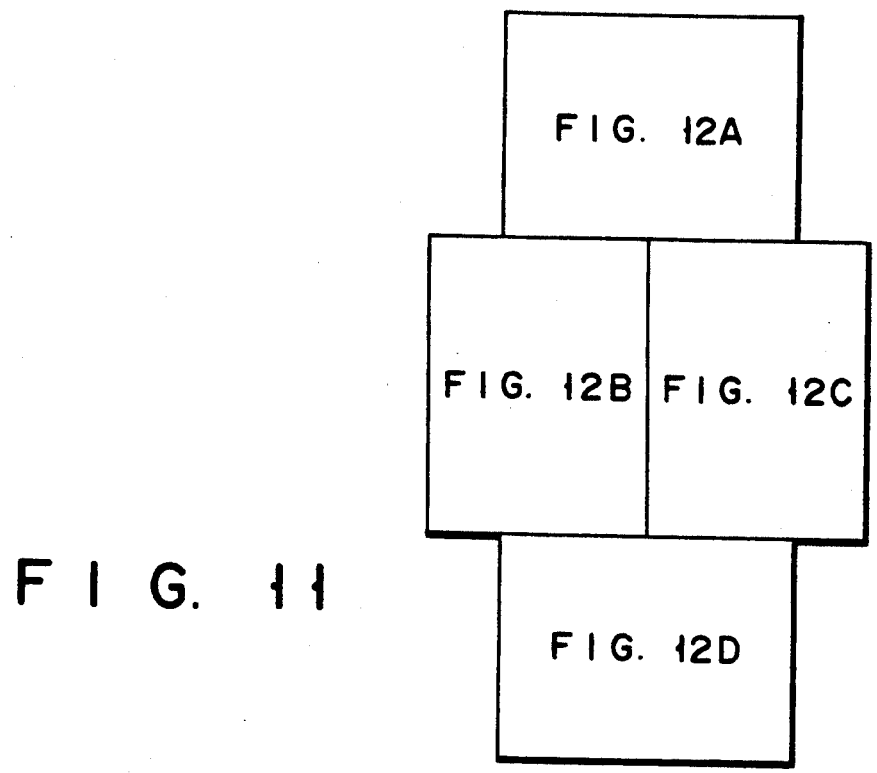
FIG. 11 is a view showing an arrangement of flow charts in FIGS. 12A to 12D which show operations of the overall apparatus.
Figure 12A:
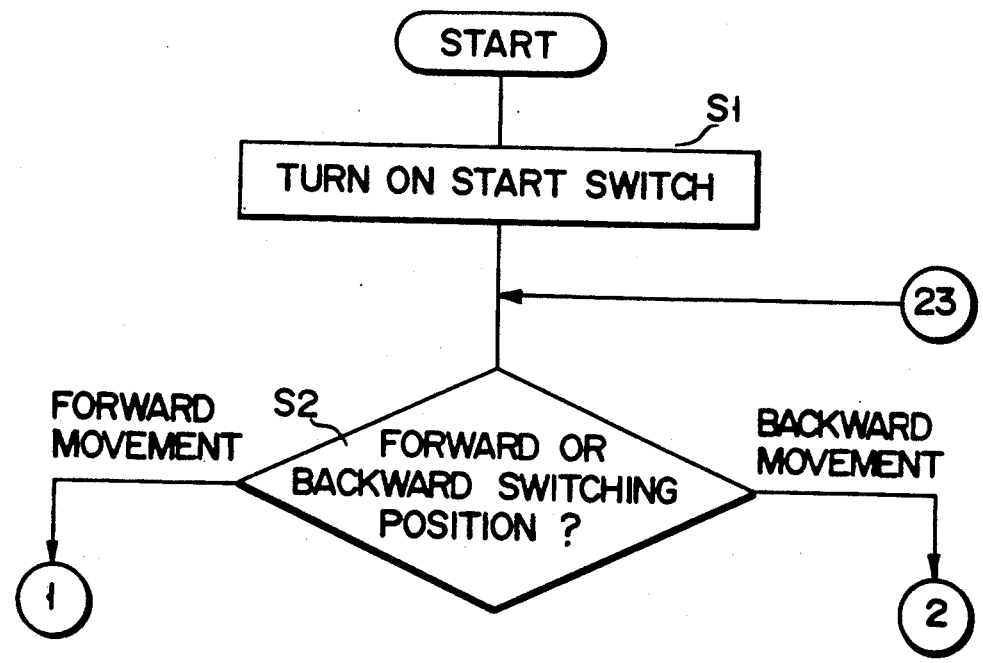
FIGS. 12A to 12D are flow charts respectively shown in FIG. 11.
Figure 12B:
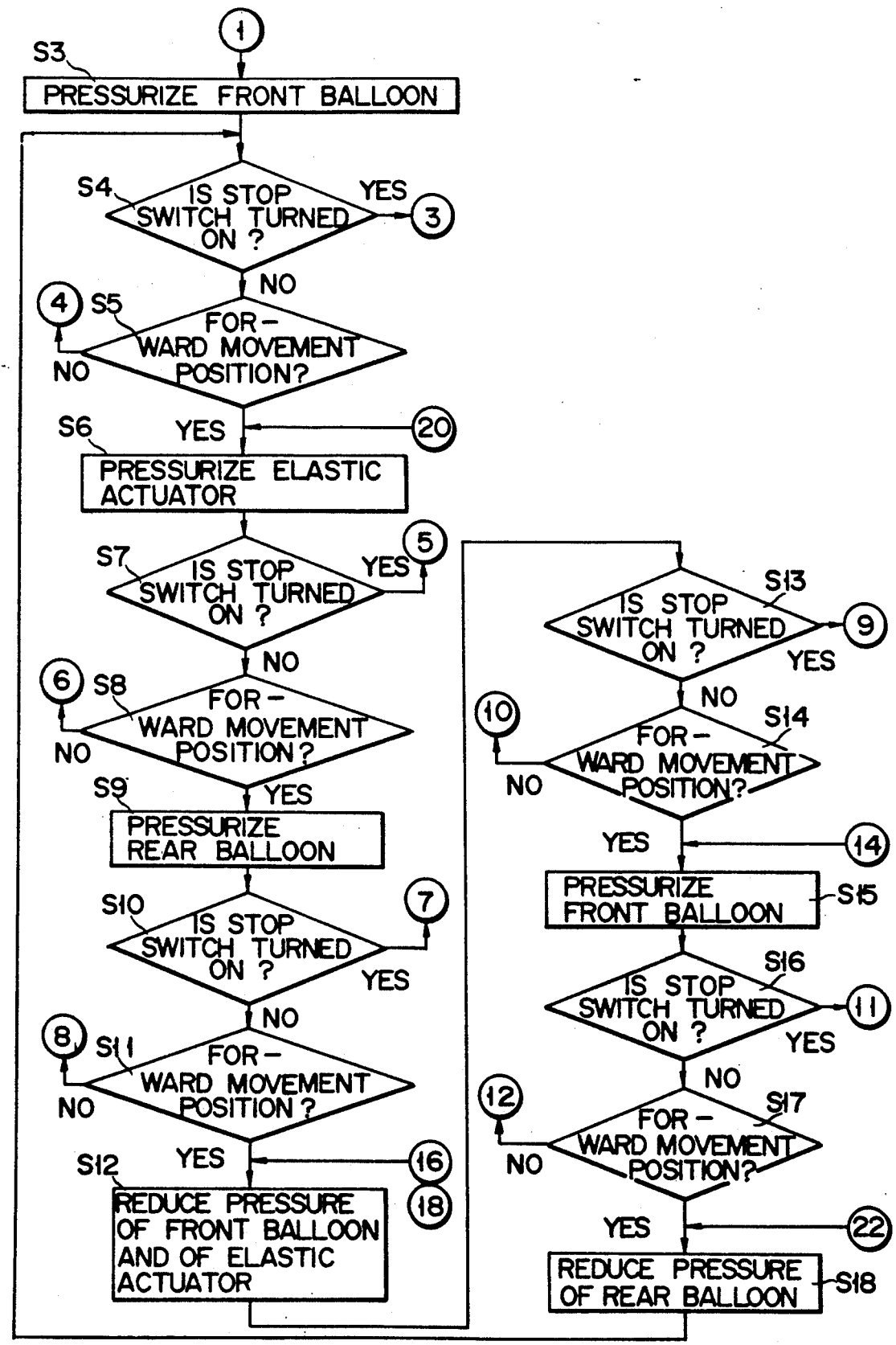
Figure 12C:
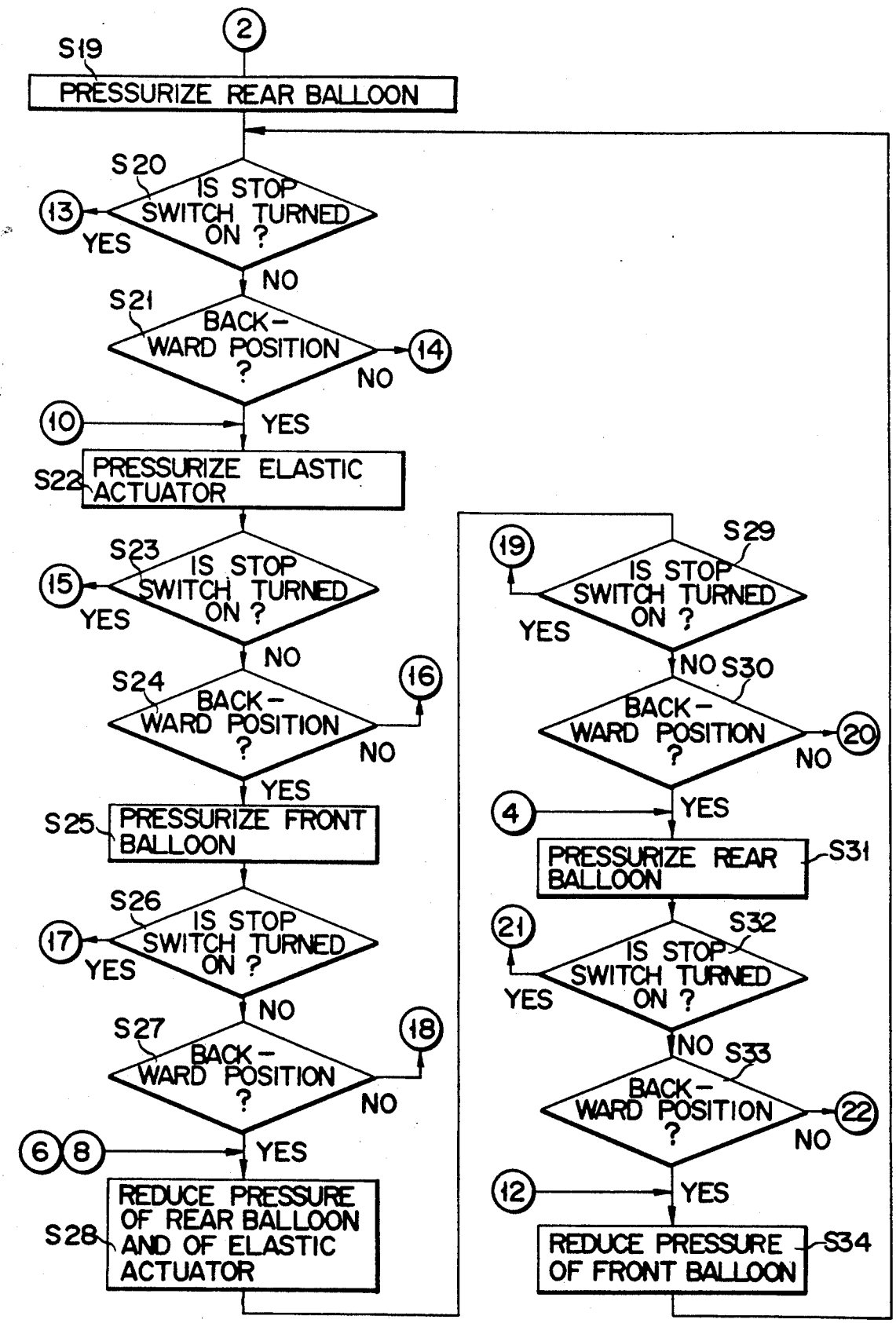
Figure 12D:
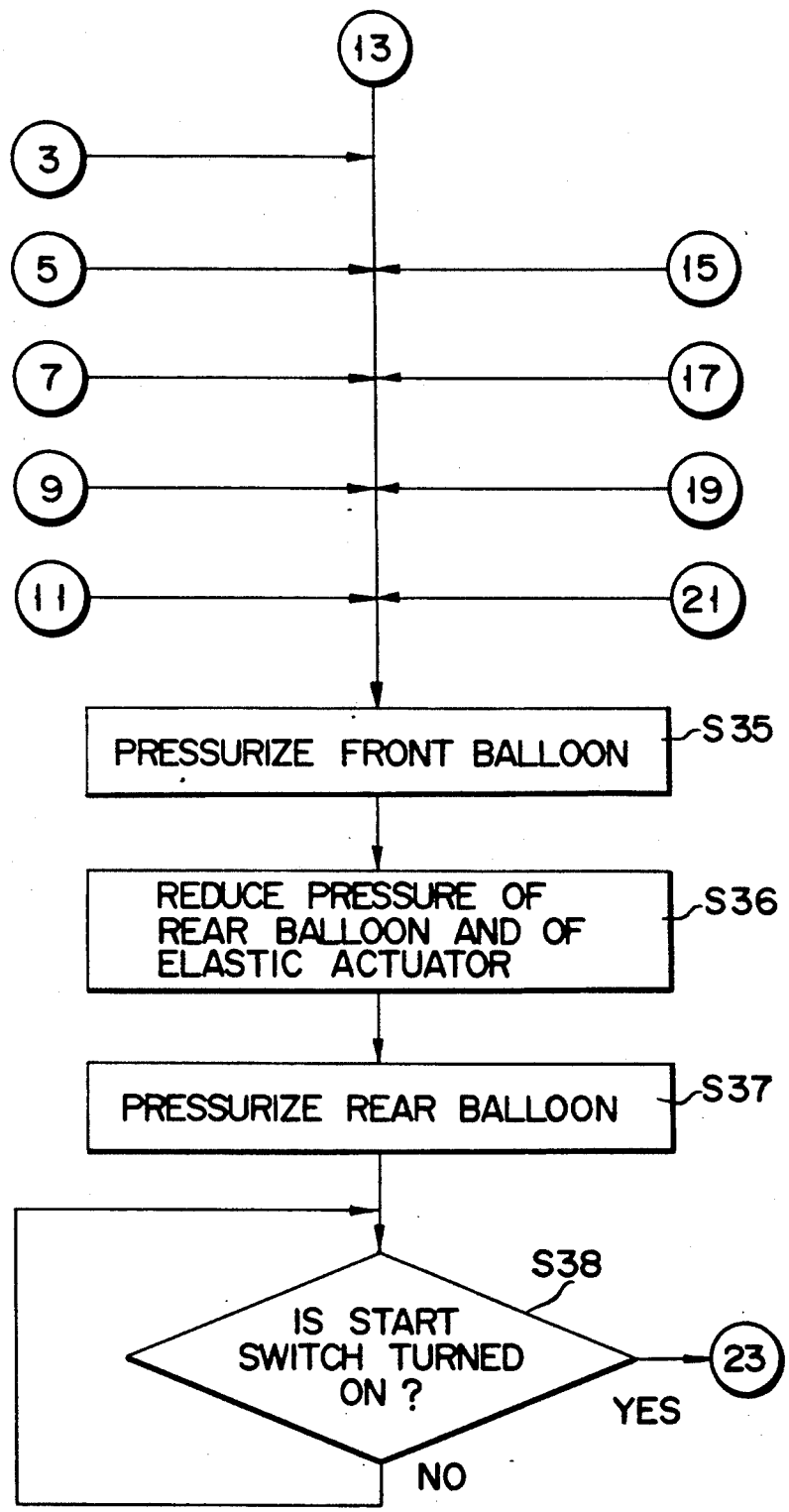

Operations of the above-described arrangement will be described below with reference to flow charts in FIGS. 12A to 12D arranged as shown in FIG. 11.

Figure 13A:
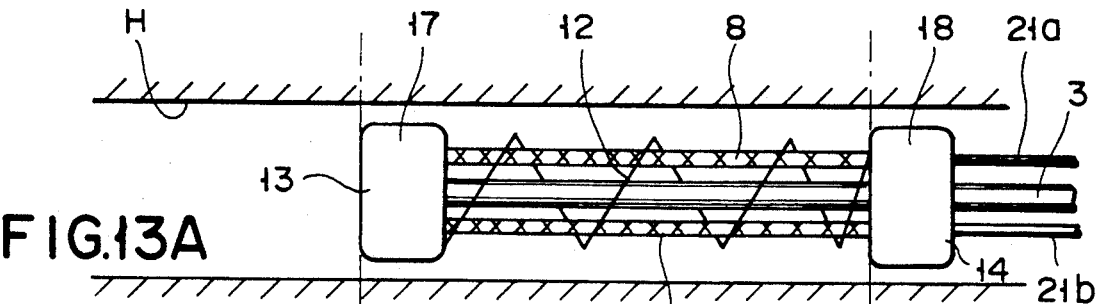
FIGS. 13A to 13D are schematic views each showing an operating state of the moving unit.

Before the power source of the intra-tube self-driven test apparatus 2 is turned on (while the apparatus 2 is not used), all the first to fifth solenoid valves 26 to 30 ar held to be switched to the first positions (the first ports a and the third ports c are connected to each other while the first ports a and the second port b are disconnected from each other), as shown in FIG. 7. In this state, the pressurized fluid in the elastic actuators 8 of the moving unit 1 is kept discharged outside through the connecting portions between the first ports a and the third ports c of the first to third solenoid valves 26 to 28. Similarly, the pressurized fluid in the front and rear balloons 17 and 18 is kept discharged outside through the connecting portions between the first ports a and the third ports c of the fourth and fifth solenoid valves 29 and 30. As a result, as shown in FIG. 13A, the three elastic actuators 8 are axially urged and expanded by the biasing force of the compression spring 12 so as to be held in a normal state wherein they are radially contracted. Similarly, the front and rear balloons 17 and 18 are held in a normal state wherein they are not elastically deformed. At this time, the outer diameters of the front and rear balloons 17 and 18 are smaller than the inner diameter of the pipe path H such as piping. In this state, the distal end portion of the endoscope 3 is attached to the moving unit 1. The moving unit 1 is then inserted in the pipe path H to be tested.

During forward movement of the moving unit 1, the start witch 38 is turned on while the forward/backward movement switch 40 is switched in the forward direction (step S1). When this forward movement start state is determined by the input determining section 41 of the control unit 37 (at time $t_0$ in FIG. 14) in step S2, the first to fifth solenoid valves 26 to 30 are sequentially switched/operated by the forward/backward movement control section 42 in accordance with a predetermined forward movement operation program, as shown in FIG. 14. As a result, a pressurized fluid (high-pressure air) is sequentially supplied to the front balloon 17, the elastic actuators 8, and the rear balloon 18 to be alternately inflated in the radial direction.

Figure 13B:
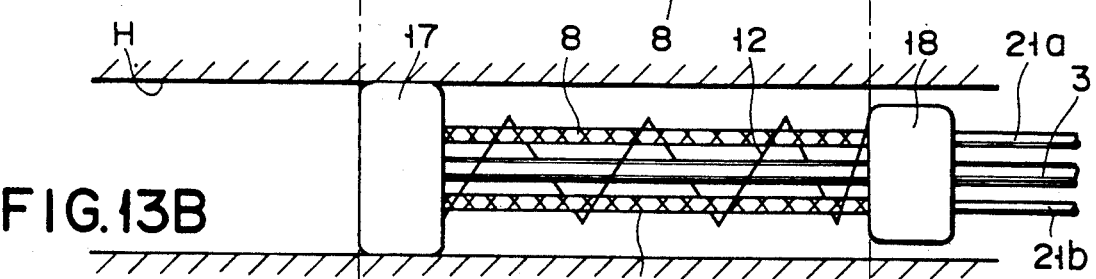

That is, at time $t_0$ when the start switch 38 is turned on, only the fourth solenoid valve 29 for the front balloon 17 is switched to the second position to supply high-pressure air to only the front balloon 17 (step S3). In this state, as shown in FIG. 13(b), only the front balloon 17 is inflated so that the front portion of the moving unit 1 is locked to the inner surface of the pipe path H with the urging force of the front balloon 17. Note that reference numerals 1 and 0 in FIG. 14 respectively denote supply and discharge states of high-pressure air.

During this operation, the states of the stop switch 39 and of the forward/backward switch 40 are always monitored (steps S4 and S5).

Figure 13C:
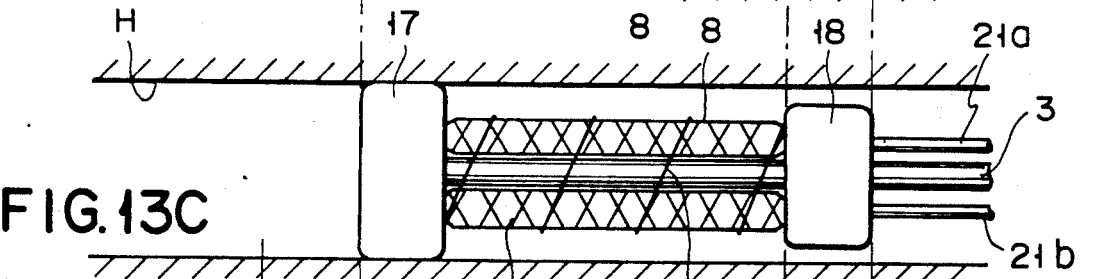

When a predetermined period of time elapses in this state (at time $t_1$), the first, second, and third solenoid valves 26, 27, and 28 for the elastic actuators 8 are switched to the respective second positions. In this case, high-pressure air is supplied to the elastic actuators 8 so that they are elastically deformed to expand in the radial direction and are contracted in the axial direction against the biasing force of the compression spring 12, as shown in FIG. 13C (step S6). Upon deformation of the elastic actuators 8, the lock unit 14 on the rear side of the moving unit 1 is pulled from a position $L_1$ to a position $L_2$ in FIGS. 13A to 13D, and the total length of the moving unit 1 is reduced. At this time, as the elastic actuators 8 are contracted/deformed in the axial direction, the compression spring 12 is compressed.

During this operation, the states of the stop switch 39 and of the forward/backward movement switch 40 are always monitored (steps S7 and S8).

Figure 13D:
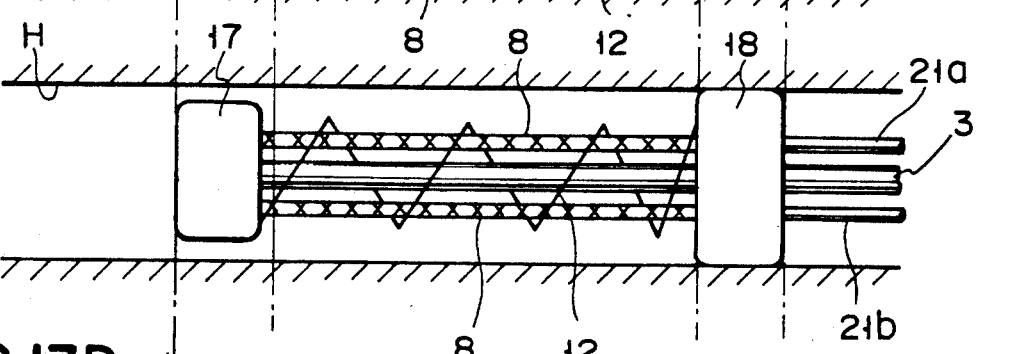

At time $t_2$ when a predetermined period of time elapses in this state, the fifth solenoid 30 for the rear balloon 18 is switched to the second position to supply high-pressure air to the rear balloon 18. As a result, the rear balloon 18 is inflated (step S9). The rear balloon 18 is urged against the inner surface of the pipe path H, and the rear portion of the moving unit 1 is locked to the inner surface of the pipe path H with the urging force of the rear balloon 18, as shown in FIG. 13D.

During this operation, the states of the stop switch 39 and of the forward/backward movement switch 40 are always monitored (steps S10 and S11).

After the rear balloon 18 is inflated, the fourth solenoid valve 29 for the front balloon 17 is switched to the first position so as to discharge the high-pressure air outside the front balloon 17 (step S12). As the high-pressure air is discharged, the front balloon 17 is contracted in the radial direction, and the lock between the front balloon 17 and the inner surface of the pipe path H is released. When the first, second, and third solenoid valves 26, 27, and 28 for the elastic actuators 8 are subsequently switched to the first positions in this state to discharge the high-pressure air outside the elastic actuators 8, the elastic actuators 8 are contracted/deformed in the radial direction and extended in the axial direction, as shown in FIG. 13D (step S12). In this case, since the lock between the front balloon 17 of the moving unit 1 and the inner surface of the pipe path H is released, as the elastic actuators 8 are extended/deformed in the axial direction, the front portion of the moving unit 1 is moved forward with the rear balloon 18 side of the moving unit 1 being held as a support point. As a result, the total length of the moving unit 1 is restored to the original length (the length of the moving unit 1 while it is not used). For this reason, the lock unit 13 on the front portion side of the moving unit 1 is pushed forward from a position $L_3$ to a position $L_4$ as shown in FIG. 13D upon deformation of the elastic actuators 8. As a result, the distal end of the endoscope 3 is moved forward together with the lock unit 13.

During this operation, the states of the stop switch 39 and of the forward/backward movement switch 4 are always monitored (step S13 and S14).

After the lock unit 13 on the front side of the moving unit 1 is pushed forward, the fourth solenoid valve 29 for the front balloon 17 is switched to the second position to supply high-pressure air to only the front balloon 17 (step S15). Only the front balloon 17 is subsequently inflated, and the front portion of the moving unit 1 is locked to the inner surface of the pipe path H with the urging force of the front balloon 17.

During this operation, the states of the stop switch 39 and of the forward/backward movement switch 40 are always monitored (step S16 and S17).

While the front portion of the moving unit 1 is locked to the inner surface of the pipe path H with the urging force of the front balloon 17, the fifth solenoid valve 30 for the rear balloon 18 is switched to the first position so that the high-pressure air in the rear balloon 18 is discharged outside and the rear balloon 18 is deflated (step S18). As a result, the engagement between the rear balloon 18 and the inner surface of the pipe path H is released.

The flow of control for the moving unit 1 returns to step S4. By repeating this series of operations, the moving unit 1 of the intra-tube traveling unit is moved forward, and the distal end portion of the endoscope 3 is pulled in the forward direction.

When the moving unit 1 is to be moved backward, the forward/backward movement switch 40 is switched in the backward movement direction. When this backward operating state is detected by the input determining section 41 of the control unit 37, the first to fifth solenoid valves 26 to 30 are sequentially switched/operated by the forward/backward movement control section 42 in accordance with a predetermined backward movement operation program. A pressurized fluid (high-pressure air) is sequentially supplied to the rear balloon 18, the elastic actuators 8, and the front balloon 17 in the order opposite to that in the forward movement operation, i.e., from step S19 to step S34 in FIG. 12C. As a result, these components are alternately inflated to perform a backward movement operation of the moving unit 1.

Stop control for the moving unit 1 will be described below, in which the moving unit 1 is fixed at an arbitrary position in the pipe path H to be detected in the process of a series of operations for the forward or backward movement of the moving unit 1. An operation to be performed when the stop switch 39 is turned on in the process of the forward movement of the moving unit 1 as indicated by a time point B in FIG. 14 will be described below. In this case, the fourth solenoid valve 29 for the front balloon 17 is switched to the first position by the forward/backward movement control section 42 at a time point C immediately before the stop switch 39 is turned on. As a result, high-pressure air in the front balloon 17 is kept discharged outside, i.e., the front balloon 17 is held to be contracted in the radial direction. At this time, the first, second, and third solenoid valves 26, 27, and 28 for the elastic actuators 8, and the fifth solenoid valve 30 for the rear balloon 18 are held at the second positions. As a result, the rear balloon 18 is inflated, and the rear portion of the moving unit 1 is held to be locked to the inner surface of the pipe path H with the urging force of the rear balloon 18. At the same time, the elastic actuators 8 are elastically deformed to expand in the radial direction and are held to be contracted in the axial direction against the biasing force of the compression coil spring 12.

Figure 16:
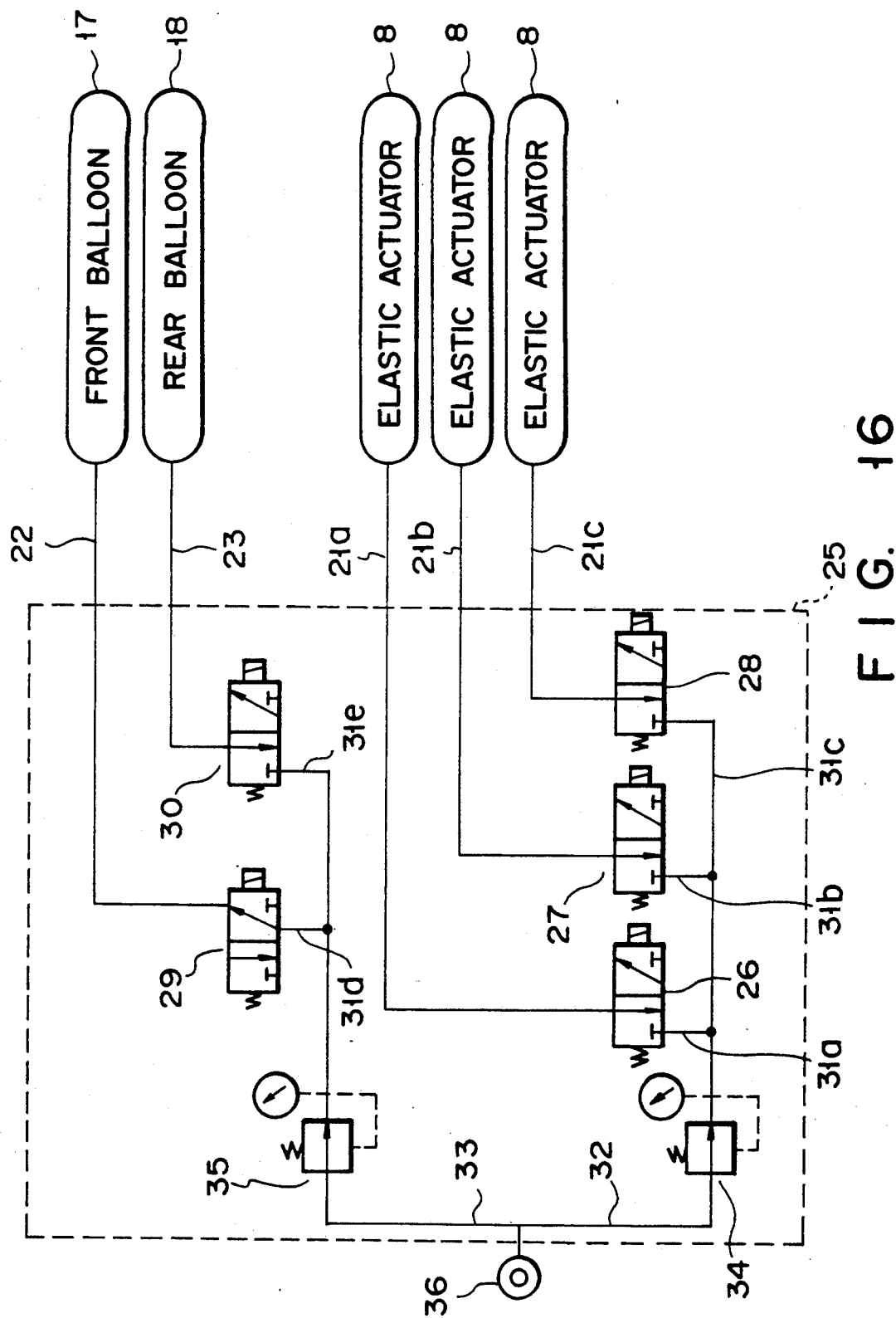
FIG. 16 is a schematic diagram showing a state wherein pressurized air is supplied to only the front balloon.

When the ON state of the stop switch 39 is determined by the input determining section 41 in this state, the forward/backward movement control by the forward/backward movement control section 42 is stopped in response to the stop signal, thus causing the stop control section 43 to perform two-step stop control with respect to the two balloons 17 and 18 of the moving unit 1 and the elastic actuators 8. Upon an ON operation of the stop switch 39, the fourth solenoid valve 29 for the front balloon 17 is switched to the second position by the stop control section 43 as shown in FIG. 16, and high-pressure air is supplied to the front balloon 17 (step S35). As a result, the front balloon 17 is inflated to cause the front portion of the moving unit 1 to be fixed on the inner surface of the pipe path H with the urging force of the front balloon 17, thus performing the first step of the stop control.

After the front balloon 17 of the moving unit 1 is fixed to the inner surface of the pipe path H, the first, second, and third solenoid valves 26, 27, and 28 for the elastic actuators 8, and the fifth solenoid valve 30 for the rear balloon 18 are switched to the first positions in response to a control signal from the stop control section 43. Subsequently, the high-pressure air is discharged from the elastic actuators 8 and the rear balloon 18 (step S36), and the elastic actuators 8 are held while they are contracted/deformed in the radial direction and are extended to their maximum lengths in the axial direction by the biasing force of the compression coil spring 12. In this case, as shown in FIG. 15, a proper time-lag $t_s$ is set between a time point B at which the fourth solenoid valve 29 for the front balloon 17 is switched to the second position and a time point B' at which the first, second, and third solenoid valves 26, 27, and 28 for the elastic actuators 8, and the fifth solenoid valve 30 for the rear balloon 18 are switched to the first positions, respectively. While the front portion of the moving unit 1 is reliably locked to the inner surface of the pipe path H, the high-pressure air is discharged from the elastic actuators 8 and the rear balloon 18.

The second step of the stop control is performed at a time point D at which a predetermined period of time has elapsed in this state and the high-pressure air has been sufficiently discharged from the elastic actuators 8 and the rear balloon 18. In the second step of the stop control, the fifth solenoid valve 30 for the rear balloon 18 is switched to the second position to supply high-pressure air to the rear balloon 18 (step S37). The rear balloon 18 is inflated to perform the second step of the stop control in which the rear portion of the moving unit 1 is locked to the inner surface of the pipe path H with the urging force of the rear balloon 18. In this case, the fourth solenoid valve 29 for the front balloon 17 is held in the second position to hold the front balloon 17 in the inflated state. At the same time, the first, second, and third solenoid valves 26, 27, and 28 for the elastic actuators 8 are held in the respective first positions so that the elastic actuators 8 are held in a state wherein they are contracted/deformed in the radial direction and are extended to the maximum length in the axial direction by the biasing force of the compression coil spring 12. While the second step of the stop control is performed, the two end portions of the moving unit 1 are urged/fixed against/to the inner surface of the pipe path H by the front and rear balloons 17 and 18, thus reliably stopping the movement of the moving unit 1.

With the above-described arrangement, if a stop signal for stopping a movement operation of the moving unit 1 is output from the stop switch 39 during a movement operation of the moving unit 1, a pressurized fluid is supplied to the two balloons 17 and 18 of the moving unit 1 by the stop control section 43 so as to inflate the two balloons 17 and 18. The moving unit 1 is then locked to the inner surface of the pipe path H by means of the front and rear balloons 17 and 18 so as to be fixed at an arbitrary position in the pipe path H, thus stably holding the moving unit 1 during a stop operation of the moving unit 1. Therefore, while an intra-tube self-driven apparatus or the like is used, the moving unit 1 is stopped at an arbitrary position in the process of moving the insertion portion 3a of the endoscope 3 in the pipe path H to be tested, such as an industrial pipe path, so that, detailed observation of, for example, a corroded portion of the inner surface of the pipe path H can be stably performed as compared with the conventional techniques. In addition, even if the moving unit 1 is to travel in a vertical pipe H, when the moving unit 1 is stopped in the process of its movement operation, the fall of the moving unit 1 can be prevented. That is, the moving unit 1 can be reliably stopped even in this case.

The moving speed of the moving unit 1 can be easily changed by changing the settings of the forward/backward movement control section 42 of the control unit 37.

Since the insertion portion 3a of the endoscope 3 can always be held in the center of the pipe path H during a stop period of the moving unit 1, upper and lower portions and left and right portions in the pipe path H can be substantially uniformly observed with the endoscope 3.

Furthermore, in the first step of the stop control to be performed upon an ON operation of the stop switch 39, the proper time lag $t_s$ is set between the time point B at which the fourth solenoid valve 29 for the front balloon 17 is switched to the second position and the time point B' at which the first, second, and third solenoid valves 26, 27, and 28 for the elastic actuators 8 and the fifth solenoid valve 30 for the rear balloon 18 are switched to the respective first positions. With this setting, the high-pressure air is discharged from the elastic actuators 8 and the rear balloon 18 while the front portion of the moving unit 1 is reliably locked to the inner surface of the pipe path H. This reliably prevents the fall of the moving unit 1 during the first step of the stop control.

In addition, the proximal end portions of the air tubes 21a, 21b, 21c, 22, and 23 for the three elastic actuators 8 and for the rear and front balloons 17 and 18 are bundled up at the end position of the winding portion 24, and this tube bundle is covered with the protective tube 25. Therefore, the respective tubes can be arranged in order as compared with a case wherein a plurality of tubes for supplying a pressurized fluid to the rear and front balloons 17 and 18 and to the elastic actuators 8 are arranged at random. This prevent disorderly, irregular arrangement of a plurality of tubes.

Moreover, portions of the air tube 23 for the rear balloon 18 and of the air tubes 21a, 21b, and 21c for the elastic actuators 8 are wound around the insertion portion 3a of the endoscope 3 behind the moving unit 1 substantially in the form of a coil with the predetermined gap ensured therebetween so as to form the winding portion 24 having the predetermined length, and the air tube 22 for the front balloon 17 is inserted in the winding portion 24 together with the insertion portion 3a of the endoscope 3. With this arrangement, during a backward/forward movement operation of the moving unit 1, the coil-like winding portion 24 constituted by the air tube 23 for the rear balloon 18 and the air tubes 21a, 21b, and 21c for the elastic actuators 8, which is fixed to the rear lock unit 14 side, is extended/contracted upon increase/decrease in total length of the moving unit 1 so as to absorb the amount of change in length corresponding to the extension/contraction amount of the moving unit 1 which is caused between the air tube 22 for the front balloon 17 and the air tubes 23, 21a, 21b, and 21c on the rear lock unit 14 side. For this reason, even if the proximal end portions of the air tubes 21a, 21b, 21c, 22, and 23 for the three elastic actuators 8 and for the front and rear balloons 17 and 18 are bundled up at the end position of the winding portion 24, the air tube 22 for the front balloon 17 which is fixed to the front lock unit 13 side is pushed forward by other tubes (the air tube 23 for the rear balloon 18 and the air tubes 21a, 21b, and 21c for the elastic actuators 8) to prevent slack of the air tube 22 upon decrease in total length of the moving unit 1 during a forward/backward movement operation of the moving unit 1. This reliably prevents the air tube 22 from coming into contact with the elastic actuators and damaging the braided reinforcing structures 10 of the elastic actuators 8 due to the slack of the air tube 22.

In the above-described embodiment, the three contraction type elastic actuators 8 are arranged between the frames 6 and 7. However, four or more contraction type elastic actuators 8 may be arranged between the frames 6 and 7.

Figure 18:
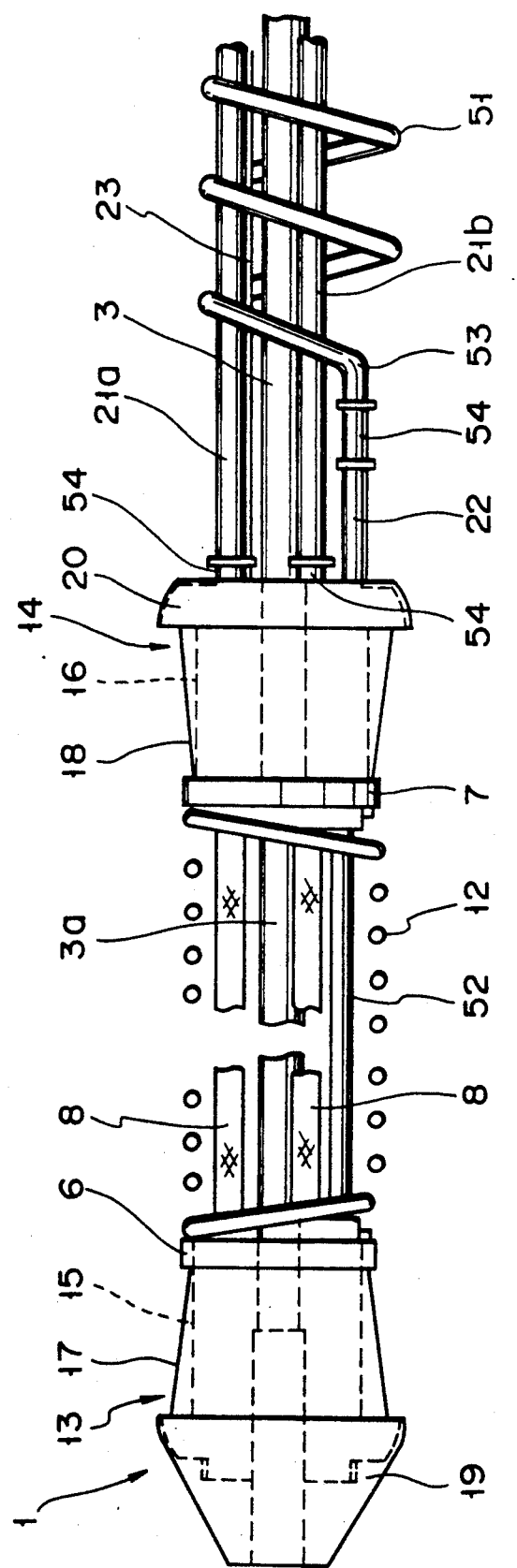
FIG. 18 is a side view showing a moving unit according to the second embodiment of the present invention.
Figure 19:
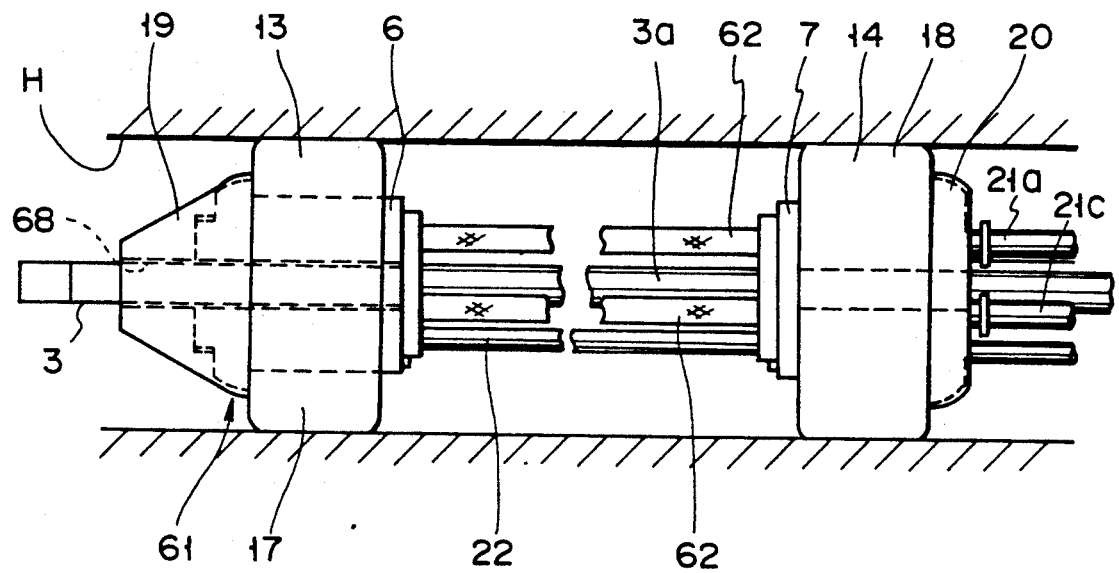
FIG. 19 is a side view showing a moving unit according to the third embodiment of the present invention.

FIG. 18 shows the second embodiment of the present invention.

In this embodiment, the arrangement of the respective tubes extending to the rear portion of a moving unit 1 is changed. More specifically, in this embodiment, an air tube 23 for a rear balloon 18 and air tubes 21a, 21b, and 21c for elastic actuators 8 are held with their extended portions on the rear side of the moving unit 1 being kept substantially linear. In addition, the extended portion, of the air tube 22 for a rear balloon 17, on the rear side of the moving unit 1 is wound into a substantially coil-like shape to form a winding portion 51 having a predetermined length. An insertion portion 3a of an endoscope 3 and the air tubes 23, 21a, 21b, and 21c are inserted in the winding portion 51 of the air tube 22 with proper gaps ensured therebetween.

The air tube 22 for the front balloon 17 is divided into a moving unit side tube 52 fixed to the rear portion of the moving unit 1 and a connecting tube 53 on the side of a pressurized air supply path switching control section 25. These tubes are coupled to each other through a coupling 54 from which the tubes can be easily detached. Similarly, the air tube 23 for the rear balloon 18 and the air tubes 21a, 21b, and 21c for the elastic actuators 8 are coupled to the rear balloon 18 and to the elastic actuators 8 through couplings 54 from which the tubes can be easily detached.

In the above-described arrangement, since the coil-like winding portion 51 of the air tube 22 for the front balloon 17 fixed to a front lock unit 13 can b extended/contracted upon decrease/increase in total length of the moving unit 1 during a forward/backward movement operation of the moving unit 1, the amount of change in length corresponding to the extension/contraction amount of the moving unit 1 which is caused between the air tube 22 for the front balloon 17 fixed to the front lock unit 13 and the air tubes 23, 21a, 21b, and 21c fixed to the rear lock unit 14 can be absorbed. In this embodiment, similar to the first embodiment, slacking of the air tube 22 can be prevented while the total length of the moving unit 1 is decreased/increased, thus reliably preventing the air tube 22 from coming into contact with the elastic actuators 8 and damaging braided reinforcing structures 10 of the elastic actuators 8.

Since the connecting tube 53, of the air tube 22 for the front balloon 17, on the side of the pressurized air supply path switching control section 25 and the air tubes 21a, 21b, and 21c for the elastic actuators 8 are detachably connected to the moving unit 1 through the couplings 54, an air tube having a length corresponding to the length of a pipe path H to be tested, such as piping, can be selected. Therefore, by selecting and using short air tubes when a pipe path H is short, a supply/discharge operation of pressurize air can be improved in response characteristics as compared with the case of using long air tubes. This contributes to an increase in travel speed of the moving unit 1.

Furthermore, in the above embodiment, when the movement of the moving unit 1 is to be stopped, the front balloon 17 is fixed first in the first step of the stop control, and the rear balloon 18 is fixed in the second step of the stop control. However, the rear balloon 18 may be fixed first in the first step of the stop control, and the front balloon 17 may be fixed in the second step of the stop control.

Alternatively, in a stop operation, the moving unit may be fixed in the pipe path H by using only one of the front and rear balloons 17 and 18.

FIGS. 19 to 23 show the third embodiment of the present invention.

This embodiment includes a moving unit 61 having an arrangement different from that of the moving unit in the first embodiment. More specifically, in this embodiment, three extension type elastic actuators 62 each having a substantially cylindrical shape, which are elastically deformed to be radially contracted and axially extended upon reception of a pressurized fluid, are used in place of the contraction type elastic actuators 8, which are elastically deformed to be radially expanded and to generate a contracting force in the axial direction upon reception of a pressurized fluid as in the first embodiment. These elastic actuators 62 are arranged between frames 6 and 7 so as to be substantially parallel to the axial direction of the moving unit 61. The two end portions of each of the elastic actuators 62 are respectively connected to the inner end faces of the frames 6 and 7 in such a manner that the respective end portions are arranged at equal intervals on the same circumference.

Figure 20:
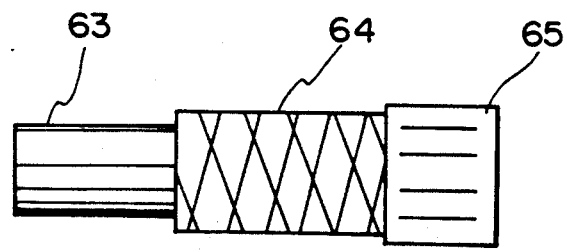
FIG. 20 is a side view showing a schematic arrangement of an elastic actuator.

As shown in FIG. 20, each elastic actuator 62 includes a tubular member 63 made of an elastic material such as rubber. This tubular member 63 is covered with a braided reinforcing structure 64 formed into a substantially tubular shape by a high-tensile fiber. In addition, the openings at the two end portions of the integral structure consisting of the tubular member 63 and the braided reinforcing structure 64 are sealed by seal members 65.

Figure 21:
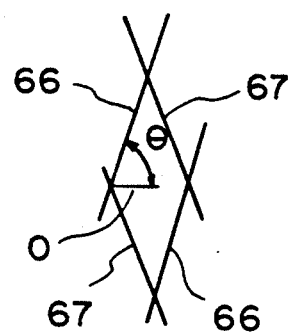
FIG. 21 is a plan view showing a state wherein warps and wefts of a braided reinforcing structure are knitted.

As shown in FIG. 21, the braided reinforcing structure 64 is formed by knitting warps 66 and wefts 67 as elements in accordance with, e.g., a plain weave scheme. A knitting angle 8 defined by a center line O extending in the axial direction of the extension type elastic actuator 62, the warp 66, and the weft 67 is set to be larger than 54° 44', e.g., within a range of 65° to 80°. When a pressurized fluid is supplied into the tubular member 63, the corresponding elastic actuator 62 is elastically deformed to be radially contracted and axially extended.

In the moving unit 61, the compression coil spring 12 in the first embodiment is omitted. In addition, an insertion hole is formed in a frame 6 on the front side of the moving unit 61 so as to allow an insertion portion 3a of an endoscope 3 to be slidably inserted therein in the axial direction, and the distal end of the endoscope 3 is mechanically fixed to a frame 7 on the rear side of the moving unit 61 by a proper fixing means.

Figure 22A:
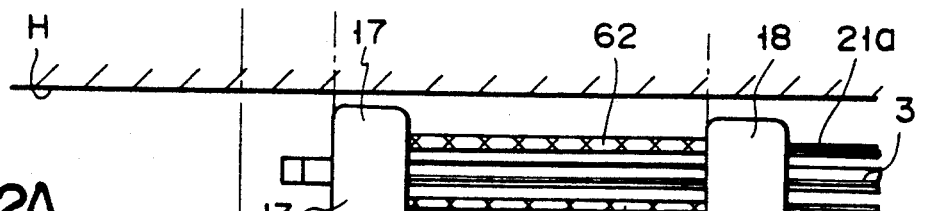
FIGS. 22A to 22D are schematic views each showing an operating state of the moving unit.
Figure 22B:
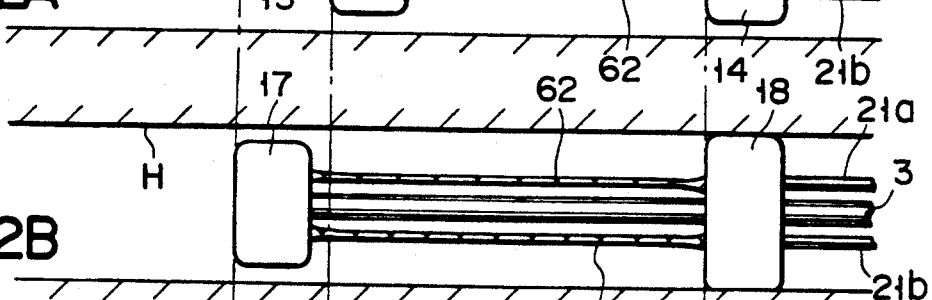
Figure 22C:
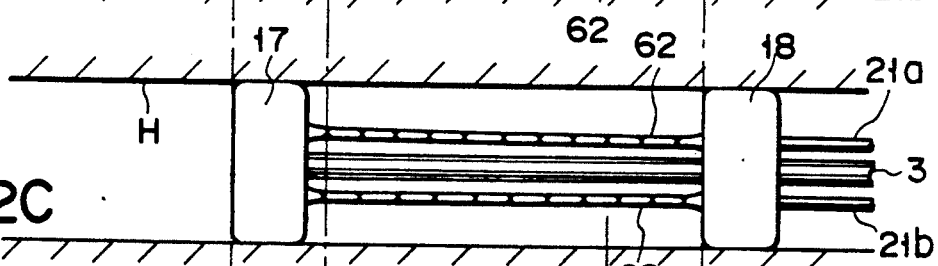
Figure 22D:
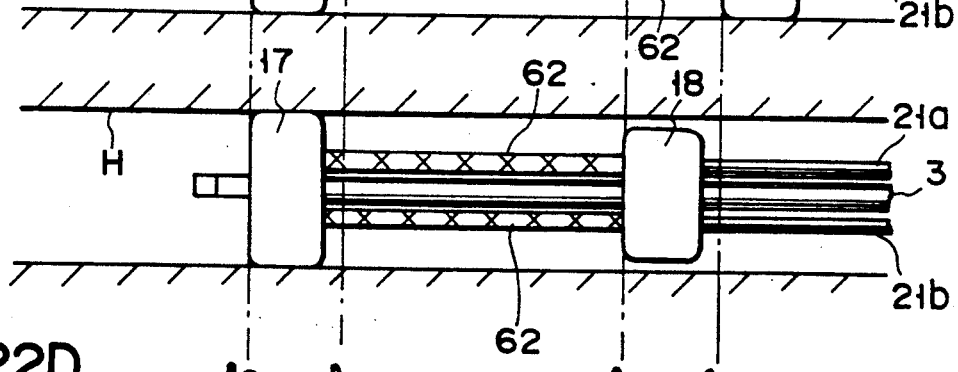
Figure 23:
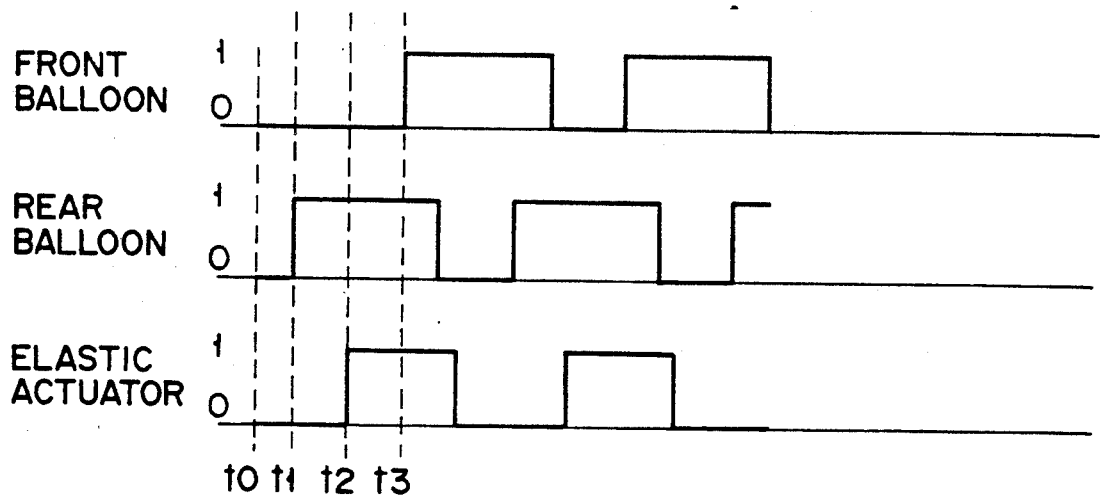
FIG. 23 is a timing chart showing a state wherein the moving unit moves forward.

An operation of the above-described arrangement will be described below with reference to FIGS. 22A to 23. FIGS. 22A to 22D respectively show forward moving states of the moving unit 61. FIG. 23 shows operation timings of front and rear balloons 17 and 18 and the three elastic actuators 62 at the respective states. Note that reference numerals 1 and 0 in FIG. 23 respectively denote supply and discharge states of high-pressure air.

Before the power source of an intra-tube self-driven test apparatus 2 is turned on (when it is not used), a pressurized fluid in the elastic actuators 62 of the moving unit 61 is discharged outside, and similarly, the front and rear balloons 17 and 18 are held with a pressurized fluid being discharged therefrom. Therefore, as shown in FIG. 22A, the three elastic actuators 62 are held in a normal state wherein they are not elastically deformed, and similarly, the front and rear balloons 17 and 18 are held in a normal state wherein they are not elastically deformed. At this time, the outer diameters of the front and rear balloons 17 and 18 are smaller than the inner diameter of a pipe path H to be tested, such as piping.

Assume that a start switch 38 is turned on while a forward/backward movement switch 40 is switched in the forward direction. At this time (time $t_1$ in FIG. 23), only a fifth solenoid valve 30 for the rear balloon 18 is switched to the second position to supply high-pressure air to only the rear balloon 18. In this state, as shown in FIG. 22B, only the rear balloon 18 is inflated, and the rear portion of the moving unit 61 is locked to the inner surface of the pipe path H with the urging force of the rear balloon 18.

When a predetermined period of time elapses in this state (at time $t_2$), first, second, and third solenoid valves 26, 27, and 28 for the elastic actuators 62 are switched to the second positions. In this case, high-pressure air is supplied to each elastic actuator 62 so that these elastic actuators 62 are elastically deformed to be extended in the axial direction, as shown in FIG. 22B. Upon deformation of the elastic actuators 62, a lock unit 13 on the front side of the moving unit 61 is pushed forward from a position $l_1$ to a position $l_2$ in FIGS. 22A to 22D, thus increasing the total length of the moving unit 61.

At time $t_3$ when a predetermined time has further elapsed in this state, a fourth solenoid valve 29 for the front balloon 17 is switched to the second position to supply high-pressure air to the front balloon 17. As a result, the front balloon 17 is inflated to be urged against the inner surface of the front balloon 17, and the front portion of the moving unit 61 is locked to the inner surface of the pipe path H with the urging force of the front balloon 17, as shown in FIG. 22C.

After the front balloon 17 is inflated, the fifth solenoid valve 30 for the rear balloon 18 is switched to the first position to discharge the high-pressure air outside the rear balloon 18. At the same time, the first, second, and third solenoid valves 26, 27, and 28 for the elastic actuators 62 are switched to the respective first positions to discharge the high-pressure air outside the elastic actuators 62. Upon this discharge operation of the high-pressure air, the rear balloon 18 is radially contracted, and the lock between the rear balloon 18 and the inner surface of the pipe path H is released. In addition, as the high-pressure air is discharged from the elastic actuators 62, the elastic actuators 62 are restored to the original state by their own restoring forces (elastic restoring forces). Upon restoration (contraction/deformation in the axial direction) of the elastic actuators 62, the rear portion of the moving unit 61 is moved in the forward direction while the front balloon 17 held in a lock state serves as a support point. As a result, the lock unit 14 on the rear side is towed in the forward direction from a position $l_3$ to a position $l_4$, as shown in FIG. 22D. Thus, the distal end portion of the endoscope 3 is moved forward together with the lock unit 14.

By repeating this series of operations, a forward movement operation of the moving unit 61 of the intratube traveling apparatus is performed, and the distal end portion of the endoscope 3 is towed in the forward direction.

Stop control for fixing the moving unit 61 at an arbitrary position in the pipe path H to be tested in the process of a series of operations for forward or backward movement of the moving unit 61 is performed in substantially the same manner as described in the first embodiment.

With the above-described arrangement, the same effects as those in the first embodiment can be obtained. In this embodiment, since the compression coil spring 12 of the first embodiment can be omitted, flexibility of the overall moving unit 61 can be improved. Therefore, the capability of the moving unit 1 to pass through curved and bent portions in the pipe path H during travel therein can be improved.

In the above embodiment, the three extension type elastic actuators 62 are arranged between the frames 6 and 7. Four or more extension type elastic actuators 8 may be arranged between the frames 6 and 7. In this case, the tractive power for the moving unit 61 can be further increased.

Figure 24:
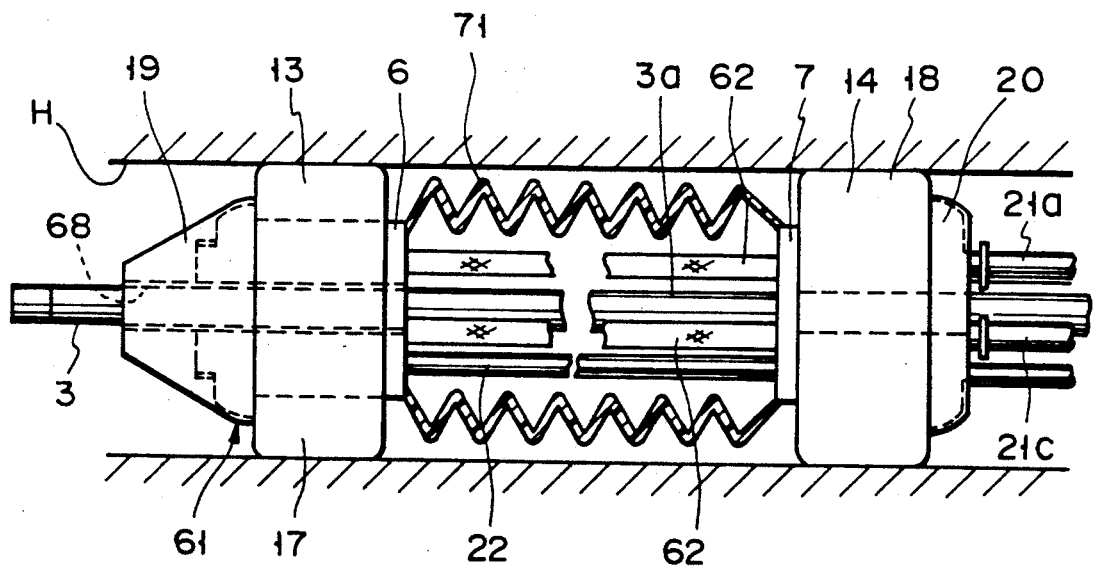
FIG. 24 is a partially sectional side view of a moving unit according to the fourth embodiment of the present invention.

FIG. 24 shows the fourth embodiment of the present invention.

In this embodiment, extendible bellows 71 are arranged between frames 6 and 7, and three extension type elastic actuators 62 and the like are accommodated in the bellows 71.

In this case, since the extension type elastic actuators 62 and the like can be protected from oil, filth, and the like in a pipe path H to be tested while a moving unit 61 travels in the pipe path H, the durability of the apparatus can be improved.

Figure 25:
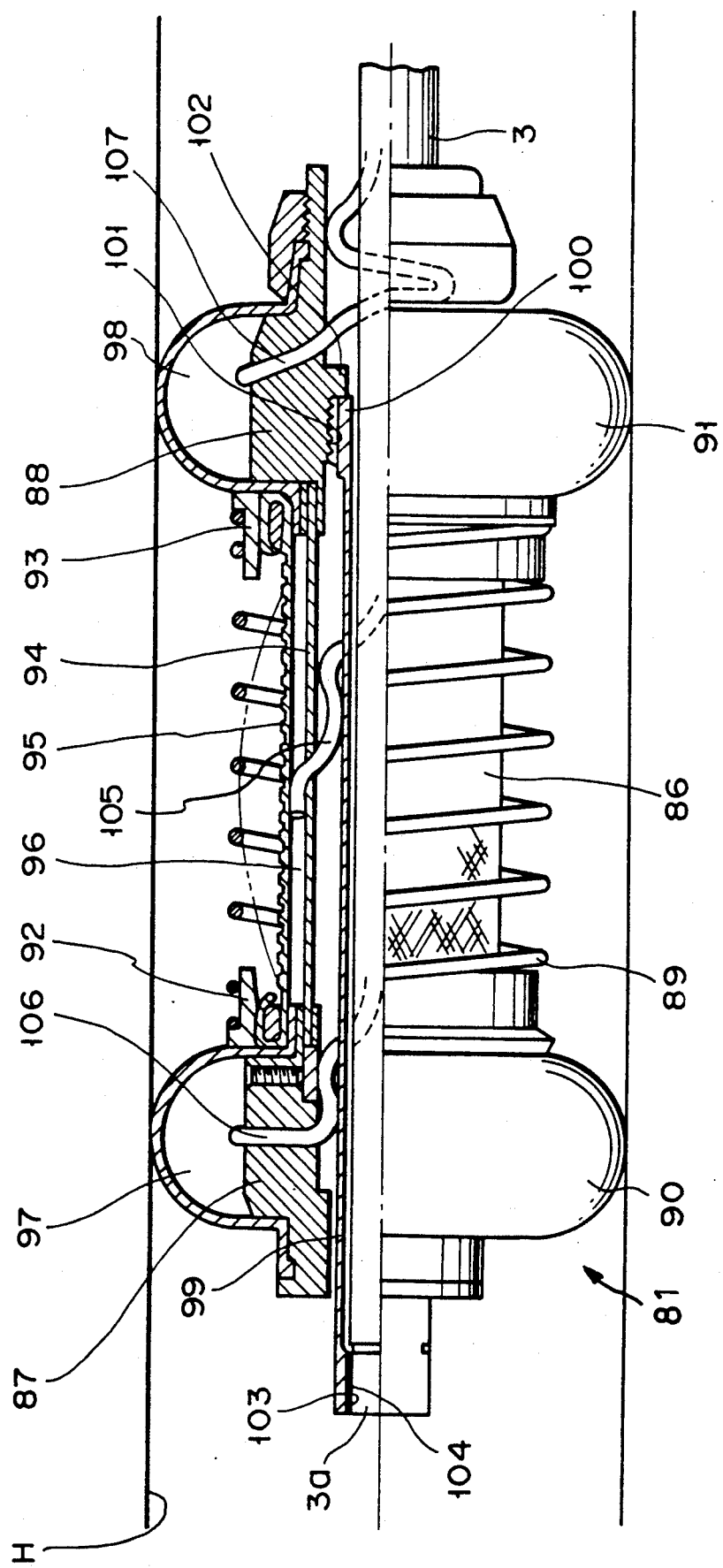
FIG. 25 is a partially sectional side view of a moving unit according to the fifth embodiment of the present invention.
Figure 26:
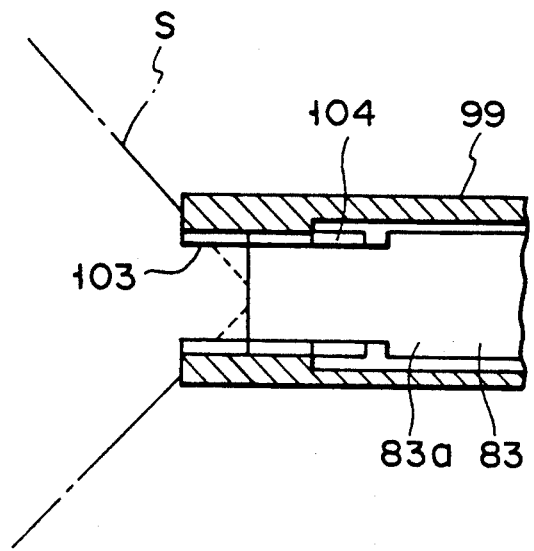
FIG. 26 is a longitudinal sectional view showing the structure of a connecting portion between a connecting cylinder and an endoscope inserting portion.
Figure 27:
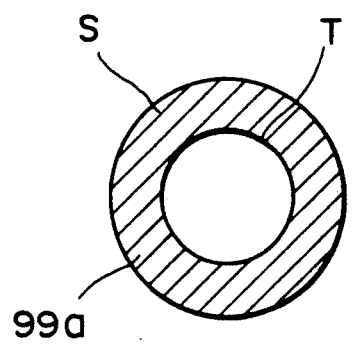
FIG. 27 is a schematic view showing the field of view of an endoscope.

FIGS. 25 to 27 show the fifth embodiment of the present invention.

FIG. 25 shows a schematic arrangement of a moving unit 81 of an intra-tube traveling apparatus of this embodiment. This moving unit 81 comprises: an elastic actuator 86 which is elastically deformed in the radial direction and generates a contracting force in the axial direction upon reception of a pressurized fluid; a pair of front and rear frames 87 and 88 respectively provided to the two ends of the elastic actuator 86; a spring member 89, having a substantially coil-like shape and arranged between the frames 87 and 88, for generating a biasing force in a direction opposite to the axial contraction/-deformation direction of the elastic actuator 86; and a pair of front and rear balloons (lock portions) 90 and 91 respectively attached to the frames 87 and 88 and capable of being inflated upon reception of a pressurized fluid so as to be locked to the inner surface of a pipe path. In this case, the frames 87 and 88 are respectively constituted by substantially cylindrical members separated to oppose each other in the axial direction. Fixing portions 92 and 93 of the elastic actuator 86 are respectively arranged on the end portions on the opposing surfaces of the cylindrical members of the frames 87 and 88.

In addition, inner and outer cylinders 94 and 95 each consisting of an elastic material such as rubber are substantially concentrically arranged in the elastic actuator 86. The inner and outer cylinders 94 and 95 each have a substantially cylindrical reinforcement netting structure which is made of, for instance, highly tensile fibers and is embedded within the elastic wall of the respective cylinders. The two end portions of each of the inner and outer cylinders 94 and 95 are respectively connected to the fixing portions 92 and 93 of the front and rear frames 87 and 88 in an airtight state. A sealed chamber 96 is formed between the inner and outer cylinders 94 and 95. By supplying a pressurized fluid into the sealed chamber 96, the elastic actuator 86 is elastically deformed in the radial direction and generates a contracting force in the axial direction. The inner cylinder 94 is reinforced by, for instance, a coiled reinforcement such that the inner cylinder 94 is allowed to expand and contract in its axial direction but is hardly allowed to expand and contract in its radial direction. (This structure prevents the radial expansion of the inner cylinder 94 when it is pressurised.)

The spring member 89 is wound around the elastic actuator 86 with a proper gap ensured therebetween. The two end portions of the spring member 89 are respectively fixed to the outer surfaces of the fixing members 92 and 93 of the front and rear frames 87 and 88.

In addition, the front and rear balloons 90 and 91 are respectively fixed to the outer surfaces of the front and rear frames 87 and 88. In this case, sealed chambers 97 and 98 are respectively formed between the front and rear balloons 90 and 91 and the outer surfaces of the front and rear frames 87 and 88. By supplying a pressurized fluid into these sealed chambers 97 and 98, both the balloons 90 and 91 are inflated to be locked to the inner surface of the proper pipe path H to be tested.

A connecting cylinder 99 for connecting an insertion portion 3a of the an endoscope 3 to the moving unit 81 is arranged in the moving unit 81. A male thread portion 100 is formed on the outer surface of the rear end portion of the connecting cylinder 99. A female thread portion (fixing portion) 101 to be threadably engaged with the male thread portion 100 of the connecting cylinder 99 and a stopper 102 for preventing removal of the moving unit 81 are formed on the inner surface of the rear frame 88. In this case, the stopper 102 is constituted by a substantially ring-like projection extending toward the inner surface of the rear frame 88. The inner diameter of the stopper 102 is set to be smaller than the outer diameter of the outer surface of the rear portion of the connecting cylinder 99. By causing the rear end portion of the connecting cylinder 99 to be brought into contact with the stopper 102, removal of the moving unit 81 is prevented.

The front end portion of the connecting cylinder 99 extends forward from the moving unit 81 through the inner cylinder 94 of the elastic actuator 86 of the moving unit 81 and through the cylindrical body of the front frame 87. In this case, a proper gap is formed between the outer surface of the front end portion of the connecting cylinder 99 and the inner surface of the cylindrical body of the front frame 87, and the front frame 87 is slidable along the connecting cylinder 99. A female thread portion 103 for fixing the endoscope is formed on the inner surface of the front end portion of the connecting cylinder 99.

The distal end portion of the insertion portion 3a of the endoscope 3 is inserted in the connecting cylinder 99 from its rear portion. In this case, a male thread portion 104 to be threadably engaged with the female thread portion 103 of the connecting cylinder 99 is formed on the outer surface of the distal end portion of the insertion portion 3a of the endoscope 3. The male thread portion 104 of the endoscope 3 is threadably engaged with the female thread portion 103 of the connecting cylinder 99 so as to be fixed and integrated therewith. With this arrangement, the inserting portion 3a of the endoscope 3 is fixed to the female thread portion 101 on the inner surface of the rear frame 88 through this connecting cylinder 99.

The distal end portions of air tubes 105, 106, and 107 for supplying a pressurized fluid are respectively connected to the interiors of the sealed chamber 96 of the elastic actuator 86 and of the sealed chambers of the front and rear balloons 90 and 91. The proximal end portions of the air tubes 105, 106, and 107 are connected to a pressurized fluid supply means such as a compressor through solenoids. In addition, the solenoids of the respective air tubes are connected to a movement control means such as a sequencer. This sequencer switches/controls a supply state of a pressurized fluid from the compressor into the sealed chamber 96 of the elastic actuator 86 and the sealed chambers 97 and 98 of the front and rear balloons 90 and 91, and a discharge state of the pressurized fluid from the sealed chambers 96, 97, and 98, thereby performing movement control to move the moving unit 81 forward or backward by supplying/discharging the pressurized fluid into/from the sealed chamber 96 of the elastic actuator 86 in accordance with alternate supply/discharge of the pressurized fluid into/from the sealed chambers 97 and 98 of the front and rear balloons 90 and 91.

An operation of the above-described arrangement will be described below.

In a normal state, the moving unit 81 is held in a state wherein the pressurized fluid in the sealed chamber 96 of the elastic actuator 86 is discharged outside, and similarly, the pressurized fluid in the sealed chambers 97 and 98 of the front and rear balloons 90 and 91 is discharged outside. In this state, the elastic actuator 86 is held in a normal state wherein it is pushed and extended in the axial direction and is contracted in the radial direction by the biasing force of the spring member 89. At the same time, the front and rear balloons 90 and 91 are held in a normal state wherein they are contracted in the radial direction. The distal end portion of the inserting portion 3a of the endoscope 3 is attached to the moving unit 81 in this state, and the moving unit 81 is inserted in the proper pipe path H such as piping to be tested.

During a forward movement operation of the moving unit 81, only the solenoid valve for the front balloon 90 is switched to supply high-pressure air to only the front balloon 90. In this state, only the front balloon 90 is inflated, and the front portion of the moving unit 1 is locked to the inner surface of the pipe path H with the urging force of the front balloon 90.

Subsequently, the solenoid valve for the elastic actuator 86 is switched in this state to supply high-pressure air to the elastic actuator 86. Upon supply of this high-pressure air, the elastic actuator 86 is elastically expanded/deformed in the radial direction and is contracted in the axial direction against the biasing force of the spring member 89. Upon deformation of the elastic actuator 86, the rear frame 88 of the moving unit 81 is towed forward integrally with the inserting portion 3a of the endoscope 3 fixed to the rear frame 88, thus decreasing the total length of the moving unit 81. At this time, the spring member 89 is compressed upon contraction/deformation of the elastic actuator 86 in the axial direction. Upon compression/ deformation of the spring member 89, energy acting in a direction opposite to the compression/deformation direction is accumulated in the spring member 89.

Subsequently, the solenoid valve for the rear balloon 91 is switched to supply high-pressure air to the rear balloon 91. As a result, the rear balloon 91 is inflated. The rear balloon 91 is then urged against the inner surface of the pipe path H, and the rear portion of the moving unit 81 is locked to the inner surface of the pipe path H with the urging force of the rear balloon 91.

After the rear balloon 91 is inflated, the solenoid valve for the rear balloon 90 is switched to discharge the high-pressure air outside the front balloon 90. Upon this discharge operation of the high-pressure air, the front balloon 90 is contracted in the radial direction, and the lock between the front balloon 90 and the inner surface of the pipe path H is released.

Subsequently, when the solenoid valve for the elastic actuator 86 is switched to discharge the high-pressure air outside the elastic actuator 86, the elastic actuator 86 is contracted/deformed in the radial direction and is extended in the axial direction by the biasing force of the spring member 89. Since the lock between the front balloon 90 of the moving unit 81 and the inner surface of the pipe path H has been released, the energy accumulated in the spring member 89 is released so that the front frame 87 is pushed and moved forward by the biasing force of the spring member 89. Upon extension/deformation of the elastic actuator 86 in the axial direction and elastic restoration of the spring member 89, the front portion of the moving unit 81 is moved while the portion of the moving unit 81 locked to the rear balloon 91 serves as a support point. As a result, the total length of the moving unit 81 is restored to the original length. By repeating this series of operations, forward movement of the moving unit 81 of the intra-tube traveling apparatus is performed and the distal end of the endoscope 3 is towed forward.

In the above-described arrangement, since the inserting portion 3a of the endoscope 3 is fixed to the female thread portion 101 on the inner surface side of the rear frame 88 through the connecting cylinder 99, the tractive power for moving the distal end portion of the inserting portion 3a of the endoscope 3 in the pipe path H in the forward direction during a movement operation of the moving unit 81 can be generated by the contracting force of the elastic actuator 86 in the axial direction. Therefore, the travel speed of the moving unit 81 can be properly adjusted in accordance with the magnitude of a tractive load by adjusting a supply time of the pressurized fluid to the elastic actuator 86. In addition, since the spring member 89 is only required to generate a relatively small biasing force enough to push the front frame 87 forward, a spring member having a large biasing force need not be used as the spring member 89, and the travel speed can be increased.

Furthermore, the female thread portion 101 to be threadably engaged with the male thread portion 100 of the connecting cylinder 99, and the stopper 102 for preventing removal of the moving unit 81 are formed on the inner surface of the rear frame 88. With this arrangement, when the inserting portion 3a of the endoscope 3 is detachably fixed to the female thread portion 101 on the inner surface of the rear frame 88 through the connecting cylinder 99, the rear portion of the connecting cylinder 99 is brought into contact with the stopper 102. This prevents the moving unit 81 from being removed forward from the endoscope 3.

If the threadable engagement between the male thread portion 104 of the distal end of the inserting portion 3a of the endoscope 3 and the female thread portion 103 of the connecting cylinder 99 is loosened, a distal end portion 99a of the connecting cylinder 99 enters part of a normal field of view S of the endoscope 3, as shown in FIG. 26. As a result, a substantial field of view T of the endoscope 3 is reduced, as shown in FIG. 27. Therefore, a loosening state of the engagement between the male thread portion 104 of the distal end of the inserting portion 3a of the endoscope and the female thread portion 103 of the connecting cylinder 99 can be detected on the basis of a reduction in the substantial field of view T of the endoscope 3.

Figure 28:
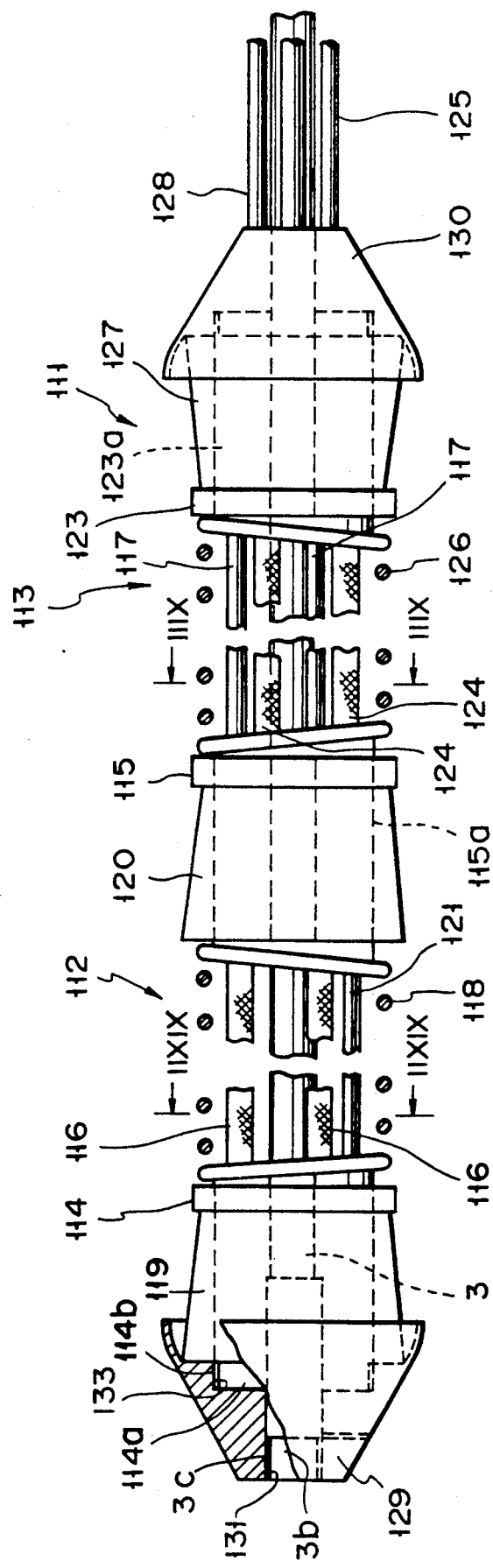
FIG. 28 is a side view showing a schematic arrangement of a moving unit according to the sixth embodiment of the present invention.

FIGS. 28 to 30 show the sixth embodiment of the present invention.

FIG. 28 shows a moving unit of a intra-tube traveling apparatus. A unit body 111 of the moving unit has a pair of front and rear unit components 112 and 113 connected in line along the axial direction.

The front unit component 112 has a pair of frames 114 and 115 separated and arranged to oppose each other in the axial direction. Three contraction type elastic actuators 116 each having a substantially tubular shape are arranged between the frames 114 and 115 so as to be substantially parallel to the axial direction. As shown in FIG. 29, these elastic actuators 116 are arranged at equal angular intervals along the circumferential direction of a reference circle $O_1$.

Each actuator 116 is formed by covering a tubular member consisting of rubber or a rubber-like elastic material with a braided reinforcing structure preferably consisting of a high-tensile fiber.

The distal end portions of three air tubes 117 for respectively supplying a pressurized fluid to the elastic actuator 116 are fixed to the intermediate frame 115 on the rear side of the moving unit. The proximal end portions of these air tubes 117 are connected to a pressurized fluid supply unit 36. The elastic actuators 116 are expanded/deformed in the radial direction and contracted in the axial direction upon reception of a pressurized fluid from the pressurized fluid supply unit 36.

A compression coil spring 118 is arranged between the frames 114 and 115 so as to generate a biasing force in a direction opposite to the axial deformation direction of each elastic actuator 116. The respective elastic actuators 116 are arranged in the coil of the compression coil spring 118.

Substantially cylindrical balloons 119 and 120 are respectively attached to the frames 114 and 115. The balloons 119 and 120 are designed to be inflated upon reception of a pressurized fluid to as to be locked to the inner surface of a pipe path H. The two end portions of each of the balloons 119 and 120 are airtightly fixed to the outer surfaces of substantially columnar balloon support portions 114a and 115a extending from the frames 114 and 115. The distal end portions of air tubes 121 and 122 are respectively connected to the balloons 119 and 120. The proximal end portions of the air tubes 121 and 122 are connected to the pressurized fluid supply unit 36 so as to supply a pressurized fluid from the unit 36 to the balloons 119 and 120.

The rear unit component 113 includes the intermediate frame 115 shared with the front unit component 112, and a rear frame 123 which is separated from the intermediate frame 115 in the axial direction so as to oppose thereto. Three contraction type elastic actuators 124 each having a substantially tubular shape, which have almost the same arrangement as that of the elastic actuators 116 of the front unit component 112, are arranged between these frames 115 and 123 so as to be substantially parallel to the axial direction. These elastic actuators 124 are also arranged at equal angular intervals along the circumferential direction of the reference circle $O_1$.

As shown in FIG. 30, each elastic actuator 124 of the unit component 113 is arranged at a position shifted from an axis, on which a corresponding one of the elastic actuators 124 of the unit component 112 is located, by a proper angle $\theta$ (about 60°). Each actuator 116 of the unit component 112 and a corresponding one of the air tubes 117 are arranged on the same axis.

The distal end portions of three air tubes 125 for supplying a pressurized fluid to the elastic actuators 124 of the unit component 113 are fixed to the rear frame 123. The proximal end portions of these air tubes 125 are connected to the pressurized fluid supply unit 36. In this case, each elastic actuator 124 of the unit component 113 and a corresponding one of the air tubes 125 are arranged on the same axis. Similar to the elastic actuators 116 of the unit component 112, these elastic actuators 124 are designed to be expanded/deformed in the radial direction and contracted in the axial direction upon reception of a pressurized fluid from the pressurized fluid supply unit 36.

A compression coil spring 126 is arranged between the frames 115 and 123 to generate a biasing force in a direction opposite to the axial deformation direction of each elastic actuator 124. The respective elastic actuators 124 are arranged in the coil of the compression coil spring 126.

A substantially cylindrical balloon 127 is attached to the rear frame 123. The balloon 127 is inflated upon reception of a pressurized fluid so a to be locked to the inner surface of the pipe path H in which the intra-tube traveling apparatus is inserted. The two ends of the balloon 127 are airtightly fixed to the outer surface of a substantially columnar balloon support portion 123a extending from the frame 123. The distal end portion of an air tube 128 is connected to the balloon 127 The proximal end portion of the air tube 128 is connected to the pressurized fluid supply unit 36 so that a pressurized fluid is supplied from the pressurized fluid supply unit 36 to the balloon 127.

In addition, the unit body 111 includes protectors 129 and 130 respectively arranged on the front end portion of the unit component 112 and on the rear end portion of the unit component 113. In this case, female thread portions 131 and 133 are formed on the protector 129 on the front side. The female thread portion 131 is threadably engaged with a male thread portion 3c of a distal end portion 3b of the endoscope 3. The female thread portion 133 is threadably engaged with a male thread portion 114b formed on the distal end portion of the balloon support portion 114a. The unit body 111 and the endoscope 3 are detachably connected to each other in such a manner that the male thread portion 3c of the distal end portion 3b of the endoscope 3 is threadably engaged with the female thread portion 131 of the protector 129 on the front side, and the male thread portion 114b of the distal end portion of the balloon support member 114a is threadably engaged with the female thread portion 133.

In the above-described arrangement, the unit body 111 of the moving unit is constituted by the front and rear unit components 112 and 113 connected in line along the axial direction, and each elastic actuator 124 of the rear unit component 113 is arranged at the position shifted from the axis, on which a corresponding one of the elastic actuators 116 of the front unit component 112 is located, by the proper angle $\theta$ (about 60°). With this arrangement, each elastic actuator 116 of the front unit component 112 and a corresponding one of the air tubes 117 can be arranged on the same axis. Unlike the case wherein each air tube 117 for supplying a pressurized fluid to a corresponding one of the elastic actuators 116 of the front unit component 112 is arranged at a position shifted from the axis of a corresponding one of the elastic actuators 116 of the front unit component 112, no communicating paths in the radial direction are required in the connecting portions between the elastic actuators 116 of the front unit component 112 and the air tubes 117. Therefore, the structure of each of the connecting portions between the elastic actuators 116 of the front unit component 112 and the air tubes 117 can be simplified. This allows a reduction in outer diameter of the overall unit body 111 of the moving unit.

In the above embodiment, the unit body 111 is constituted by the pair of unit components 112 and 113 connected in line along the axial direction. However, the unit body may be formed by connecting three, or four or more unit components 112 and 113 to each other.

FIGS. 31 to 35 show the seventh embodiment of the present invention.

FIG. 31 shows a schematic arrangement of a moving unit 141. The moving unit 141 includes a pair of frames 142 and 143 axially separated and arranged to oppose each other.

Three contraction type elastic actuators 144 are arranged between the frames 142 and 143 so as to be substantially parallel to the axial direction. The two ends of each of the elastic actuators 144 are respectively connected to triangular corner portions of the frames 142 and 143. In this case, each elastic actuator 144 is designed such that a tubular member 145 consisting of rubber or a rubber-like elastic material is covered with a braided reinforcing structure 146 preferably consisting of a high-tensile fiber, and the opening portions at the two ends of the resultant structure are sealed and joined by seal members 147 and caulk rings 148.

In addition, a connection hole 149 is formed in the seal member 147 on the rear side so as to communicate with the inner space of the tubular member 145. Horizontal and vertical holes 149a and 149b are formed in the connection hole 149. The horizontal hole 149a extends in the axial direction, whereas the horizontal hole 149b extends in the radial direction while communicating with the horizontal hole 149a. A female thread portion is formed on the inner surface of the vertical hole 149b. A nipple 151 connected to one end portion of an air tube 150 is threadably engaged with this female thread portion.

The other end portion of the air tube 150 is connected to a pressurized fluid supply unit 36 incorporated in a light source. Each actuator 144 is elastically deformed to be expanded in the radial direction and simultaneously generate a contracting force in the axial direction upon reception of a pressurized fluid from the pressurized fluid supply unit 36.

A compression coil spring 153 is wound around each elastic actuator 144 so as to generate a biasing force in a direction opposite to the axial contraction direction of the elastic actuator 144. The two end portions of each of the compression springs are respectively fixed to the frames 142 and 143.

Figure 32:
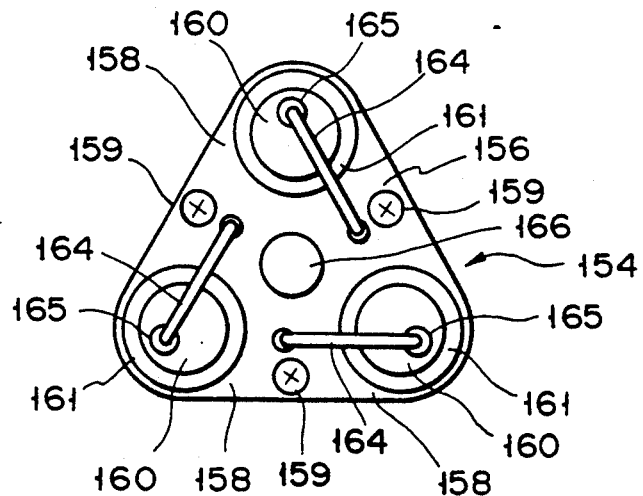
FIG. 32 is a front view of a lock unit.

Lock units 154 and 155 are detachably connected to the outer surfaces of the frames 142 and 143, respectively. As shown in FIG. 32, the lock units 154 and 155 respectively include substantially triangular unit frames 156 and 157 having diameters larger than those of the frames 142 and 143. Three lock portions 158 are connected to the respective triangular corner portions of each of the unit frames 156 and 157. The unit frames 156 and 157 are respectively fastened to the frames 142 and 143 with three fixing screws (connecting means) 159.

Each lock portion 158 is designed such that a substantially cylindrical balloon 161 is arranged around a substantially columnar block 160. In this case, the two end portions of each balloon 161 are airtightly fixed to the outer surface of the block 160 by a caulk ring 162.

An air path 163 for supplying a pressurized fluid into the balloon 161 is formed in the block 160. One opening end portion of this air path 163 is open to the interior of the balloon 161. A female thread portion is formed on the other opening end portion of the air path 163. A nipple 165 connected to one end portion of an air tube 164 is threadably engaged with this female thread portion. The other end portion of the air tube 164 is connected to the pressurized fluid supply unit 36.

The other end portion of the air tube 164 connected to each balloon 161 of the lock unit 155 on the rear side is also connected to the pressurized fluid supply unit 36. Each balloon 161 of the lock units 154 and 155 on the front and rear sides is inflated upon reception of a pressurized fluid. Upon inflation of each balloon 161 of the lock units 154 and 155, the lock units 154 and 155 can be locked to the inner surface of a pipe path H in which the moving unit 141 is to be inserted.

Insertion holes 166 for allowing the endoscope 3 to be inserted therein are respectively formed in the central portions of the frames 142 and 143 of the moving unit 141 and of the unit frames 156 and 157. While the distal end portion of the endoscope 3 is inserted in the insertion holes 166 of the frames 142 and 143 and of the unit frames 156 and 157, the front frame 142 and the endoscope 3 are mechanically fixed to each other by a proper fixing means.

As shown in, e.g., FIGS. 33 and FIGS. 35A to 35C, lock units 154' and 155' having diameters different from those of the lock units 154 and 155 are formed on the moving unit 141 in advance. These lock units 154' and 155' are formed to have larger outer diameters than the lock units 154 and 155 shown in FIGS. 31 and 32. That is, substantially triangular unit frames 156' and 157' of these lock units 154' and 155' are formed to be larger than the unit frames 156 and 157 of the lock units 154 and 155. Three lock portions 158 each having the same arrangement as that of each lock portion 158 of the lock units 154 and 155 are respectively connected to triangular corner portions of the large unit frames 156' and 157'. Insertion holes for allowing the fixing screws 159 to be inserted therein are respectively formed in the unit frames 156' and 157' of the lock units 154' and 155' at the same positions as those of the insertion holes for the fixing screws 159 which are formed in the unit frames 156 and 157 of the lock units 154 and 155. With this arrangement, lock units (one of the pairs of the small lock units 154 and 155 and the large lock units 154' and 155') each having a proper outer diameter which is selected in accordance with the diameter of the pipe path H in which the moving unit 141 is to be inserted are selectively connected to the frames 142 and 143 of the moving unit 141 with the fixing screws 159.

An operation of the above-described arrangement will be described below.

Lock units (one of the pairs of the small lock units 154 and 155 and the large lock units 154' and 155') each having a proper diameter corresponding to the diameter of the pipe path H in which the moving unit 141 is to be inserted are selectively connected to the frames 142 and 143 of the moving unit 141 with the fixing screws 159. In this case, for example, the small lock units 154 and 155 are connected to the frames 142 and 143 of the moving unit 141 with the fixing screws 159. In this state, the distal end portion of the endoscope 3 is attached to the moving unit 141, and the moving unit 141 is inserted in the proper pipe path H to be tested, such as piping.

Figure 35A:
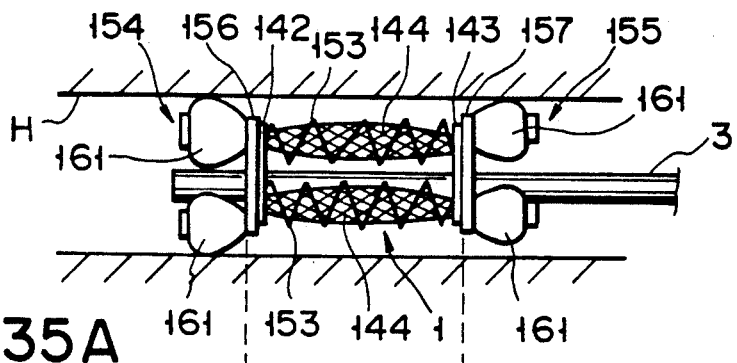
FIGS. 35A to 35C are schematic views for explaining an operation of the moving unit.

When the moving unit 141 of the intra-tube traveling apparatus is to moved forward, a pressurized fluid is supplied from the pressurized fluid supply unit 36 to each balloon 161 of the lock unit 154 on the front side. As a result, each balloon 161 of the lock unit 154 is inflated and urged against the inner surface of the pipe path H, in which the moving unit 141 is to be inserted, so as to lock the moving unit 141, as shown in FIG. 35A. In this case, each elastic actuator 144 and each balloon 161 of the lock unit 155 on the rear side are held with no pressurized fluid being supplied thereto.

Figure 35B:
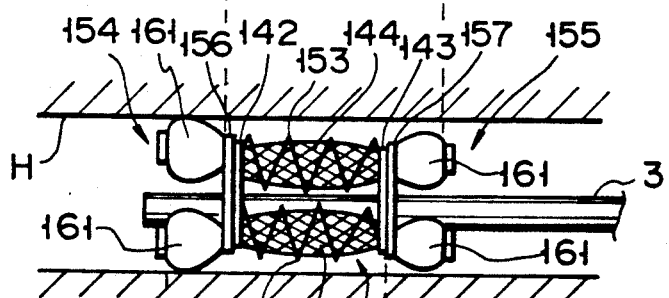

While this state is held, the pressurized fluid is supplied from the pressurized fluid supply unit 36 to each elastic actuator 144 to expand/deform it in the radial direction and to simultaneously contract it in the axial direction against the biasing force of a corresponding one of the compression springs 153, as shown in FIG. 35B. In this case, upon expansion/deformation of each elastic actuator 144, the rear frame 43 of the moving unit 141 slides and moves forward along the endoscope 3.

Subsequently, while each balloon 161 of the lock unit 154 on the front side and each elastic actuator 144 are respectively kept inflated and expanded/deformed, the pressurized fluid is supplied to each balloon 161 of the lock unit 155 on the rear side, so that each balloon 61 is inflated and urged against the inner surface of the pipe path H, in which the moving unit 141 is inserted, so as to be locked.

Figure 35C:
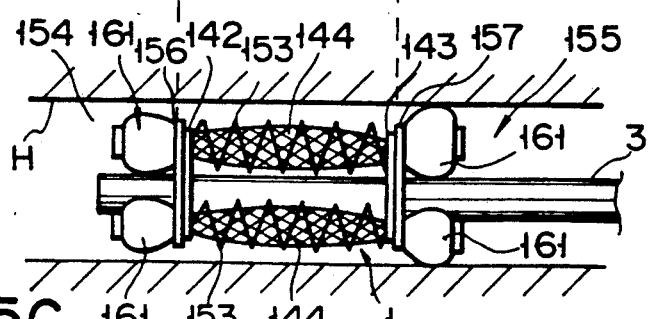

In this state, the pressurized fluid is discharged from each balloon 161 of the lock unit 155 and from each elastic actuator 144. In this state, each elastic actuator 144 is restored to the original shape by the elastic restoring force of a corresponding one of the compression coil springs 153. As a result, as shown in FIG. 35C, the front frame 142 is moved forward, and the distal end portion of the endoscope 3 is moved forward together with the front frame 142. By repeating this series of operations, a forward movement operation of the moving unit 141 of the intra-tube traveling apparatus is performed.

When the moving unit 141 of the intra-tube traveling apparatus is to be moved backward, the pressurized fluid is supplied to each balloon 161 of the lock unit 155 on the rear side first. As a result, each balloon 161 of the lock unit 155 is inflated and urged against the inner surface of the pipe path H, in which the moving unit 141 is inserted, so as to be locked.

Subsequently, the pressurized fluid is supplied to each elastic actuator 144 to expand/deform it in the radial direction. Upon expansion/deformation of each elastic actuator 144, the distal end portion of the endoscope 3 is moved backward together with the front frame 142.

The pressurized fluid is then supplied to each balloon 161 of the lock unit 154 on the front side. As a result, each balloon 161 of the lock unit 154 is inflated and urged against the inner surface of the pipe path H, in which the moving unit 141 is inserted, so as to be locked.

In this state, the pressurized fluid is discharged from each balloon 161 of the lock unit 155 on the rear side and from each elastic actuator 144 so as to cause the rear frame 143 to slide and move backward along the endoscope 3. By repeating this series of operations, the moving unit 141 of the intra-tube traveling apparatus is moved backward.

If the pipe path H to be tested, such as piping, has a large inner diameter, the moving unit 141 is detached from the endoscope 3. In this state, the fixing screws 159 are unfastened to detach the small lock units 154 and 155 from the frames 142 and 143, respectively.

Figure 33:
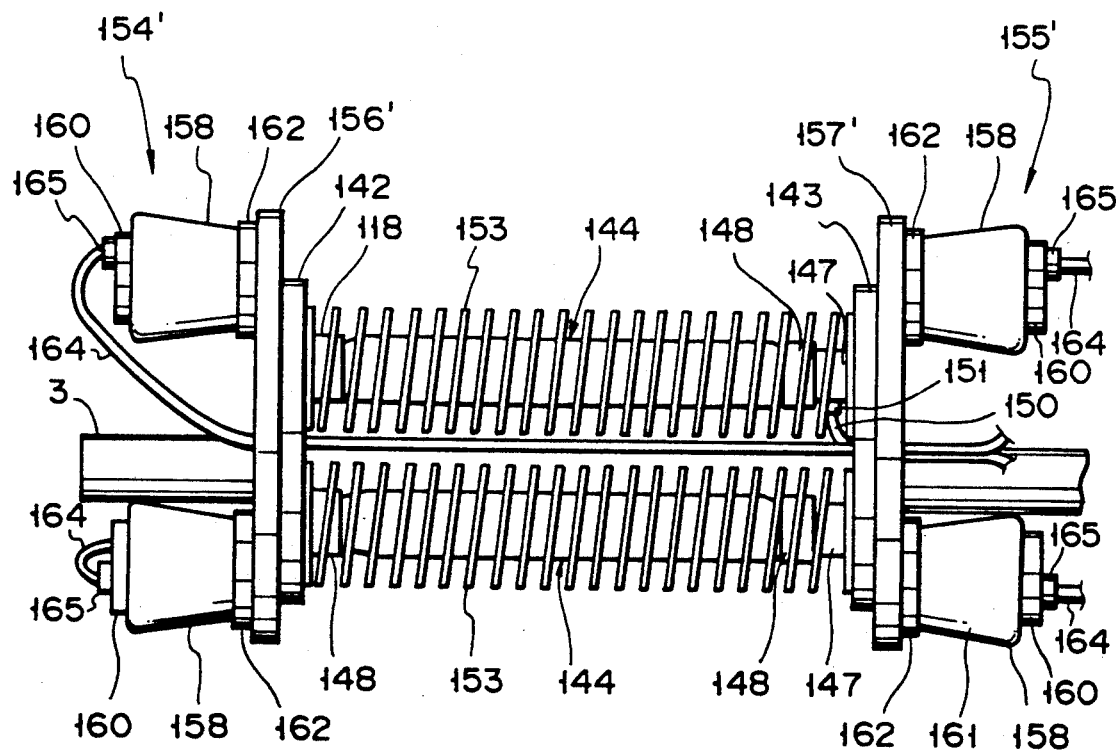
FIG. 33 is a side view showing a state wherein other lock units are connected to the frame of the moving unit.
Figure 34:
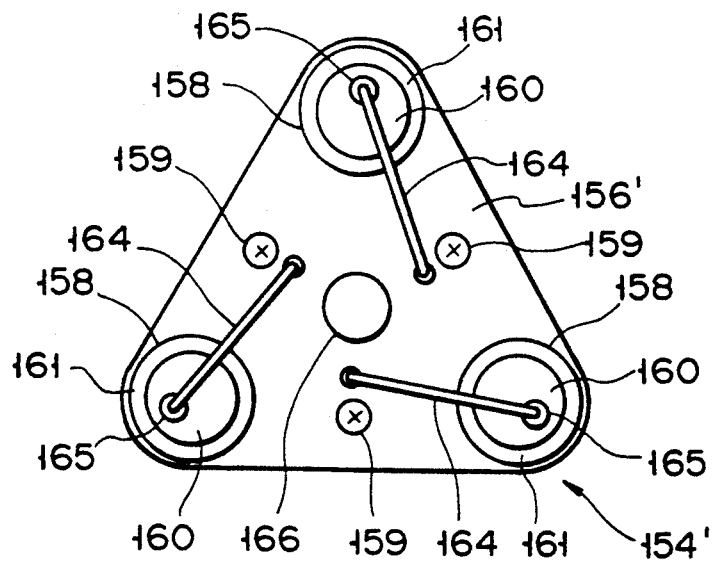
FIG. 34 is a front view showing one of the lock units in FIG. 33.

Subsequently, the large lock units 154' and 155' shown in FIGS. 33 and 34 are respectively connected to the frames 142 and 143 of the moving unit 141 with the fixing screws 159, thus setting the large lock units 154' and 155' on the frames 142 and 143 of the moving unit 141. After the distal end of the endoscope 3 is attached to the moving unit 141 in this state, the moving unit 141 is inserted in the pipe path H to be tested, and a forward or backward movement operation of the moving unit 141 is performed in the same manner as described above.

In the above-described arrangement, the lock units 154 and 155 or 154' and 155' each having an optimal outer diameter are selected in accordance with the pipe path H, in which the moving unit 141 is inserted, of the plurality of lock units 154, 155, 154', and 155' having different outer diameters. The selected lock units 154 and 155 or 154' and 155' each having an optimal outer diameter are detachably connected to the frames 142 and 143 of the moving unit 141 with the fixing screws 159. With this arrangement, the moving unit 141 can be easily fitted in the pipe path H regardless of differences in its inner diameter. Therefore, a reliable, smooth self-driving force can be obtained during a forward or backward movement operation of the moving unit 141. In addition, since a plurality of types of moving units 141 of intra-tube traveling apparatuses need not be prepared as in the conventional techniques, cost reduction can be realized and portability can be improved as compared with the conventional apparatuses.

In the above embodiment, the same amount of pressurized fluid is simultaneously supplied to each balloon 161 of the lock units 154 and 155. However, the amount of pressurized fluid to be supplied into each balloon 161 of the lock units 154 and 155 may be independently controlled. In this case, the viewing direction of the endoscope 3 can be properly adjusted.

Figure 36:
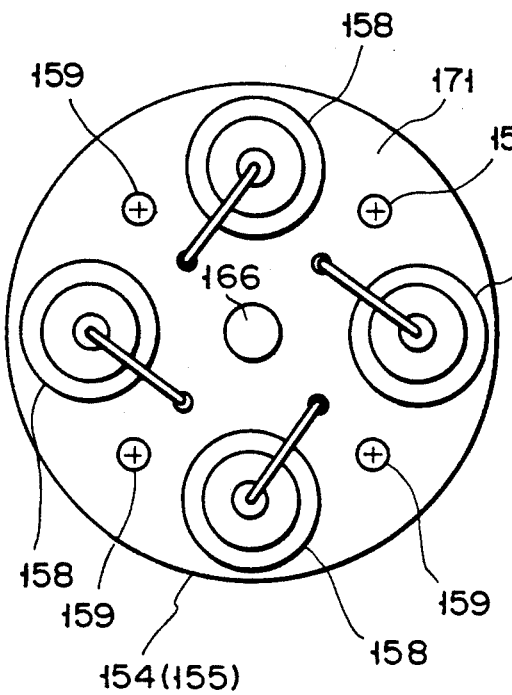
FIG. 36 is a front view showing a lock unit according to the eighth embodiment of the present invention.

FIG. 36 shows the eighth embodiment of the present invention.

In this embodiment, the lock units 154 and 155 to be detachably connected to the frames 142 and 14 of the moving unit 141 in the above embodiment are changed in shape. More specifically, each of lock units 154 and 155 includes a unit frame 171 having a substantially disk-like shape. Four lock portions 158 are arranged at equal angular intervals on a peripheral portion of this unit frame 171. In this case, as the number of lock portions 158 is increased, the lock forces of the lock units 154 and 155 which act on the inner surface of a pipe path H, in which a moving unit 141 is inserted, are increased. If, therefore, lock units 154 and 155 having four or more lock portions 158 are prepared as needed, lock units 154 and 155 having optimal holding forces can be selected in accordance with a load to be towed.

Figure 37:
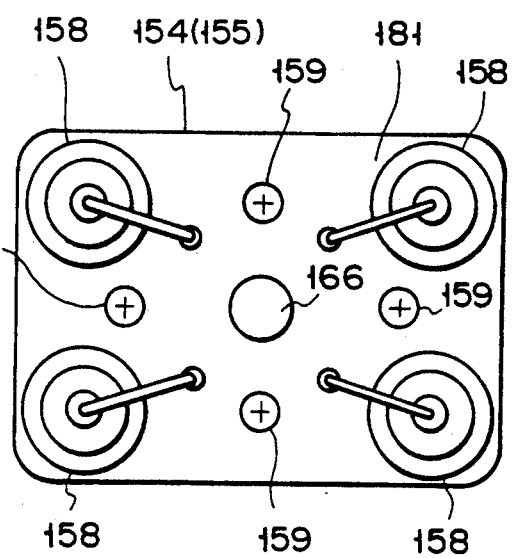
FIG. 37 is a front view showing a lock unit according to the ninth embodiment of the present invention.

FIG. 37 shows the ninth embodiment of the present invention.

In this embodiment, it is assumed that a moving unit 14 is inserted in a pipe path H having a substantially rectangular cross-section. For this purpose, each of lock units 154 and 155 includes a unit frame 181 having a substantially rectangular shape corresponding to the cross-section of this pipe path H. Four lock portions 158 are respectively arranged on the corner portions of the unit frame 181. If a pipe path H in which a moving unit 141 is to be inserted has a cross-section other than a circular cross-section, a unit frame 181 having a shape corresponding to such a cross-section is used, thus effectively increasing the holding forces of lock units 154 and 155.

Figure 38:
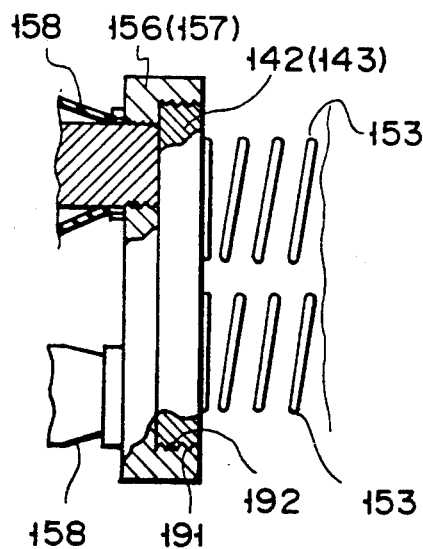
FIG. 38 is a longitudinal sectional view showing a main part of an apparatus according to the tenth embodiment of the present invention.

FIG. 38 shows the tenth embodiment of the present invention.

In this embodiment, male thread portions 191 are respectively formed on the outer surfaces of frames 142 and 143 of a moving unit 141, and female thread portions 192 to be threadably engaged with the male thread portions 191 are respectively formed on lock unit 154 and 155. With these thread portions, unit frames 156 and 157 of the lock units 154 and 155 are detachably connected to the frames 142 and 143 of the moving unit 141. In this case, the fixing screws 159 in the first embodiment can be omitted to reduce the number of components.

FIG. 39 shows the eleventh embodiment of the present invention.

In this embodiment, a pressurized fluid supply tube path between a moving unit 141 and a pressurized fluid supply unit 36 is improved.

More specifically, in this embodiment, the other end portion of each air tube 150 connected to a corresponding elastic actuator 144 of the moving unit 141 is connected to a first connecting member $R_1$. Connecting portions $r_1$, $r_2$, and $r_3$ are formed on one end portion of the first connecting member $R_1$, and a common connecting end portion $r_4$ connected to the connecting end portions $r_1$, $r_2$, and $r_3$ is formed on the other end portion of the connecting member $R_1$. The other end portion of each of the three air tubes 150 respectively connected to the three elastic actuators 144 is connected to one end portion of a corresponding one of the connecting end portions $r_1$, $r_2$, and $r_3$.

One end portion of one common air tube $150_K$ is connected to the connecting end portion $r_4$ on the other end side of the connecting member $R_1$. The other end portion of the common air tube $150_K$ is connected to the pressurized fluid supply unit 36 for supplying a pressurized fluid.

The other end portion of each air tube 164 connected to a corresponding balloon 161 of a lock unit 154 on the front side is connected to a second connecting member $R_2$. Connecting end portions $r_1$, $r_2$, and $r_3$ are formed on one end portion of the second connecting member $R_2$, and a common connecting end portion $r_4$ connected to the connecting end portions $r_1$, $r_2$, and $r_3$ is formed on the other end portion of the second connecting member $R_2$. The other end portion of each of three balloons 161 of the lock unit 154 on the front side is connected to a corresponding one of connecting end portions $r_1$, $r_2$, and $r_3$ on one end side of the second connecting member $R_2$.

One end portion of a common air tube $164_K$ is connected to the connecting end portion $r_4$ on the other end side of the second connecting member $R_2$. The other end portion of the common air tube $164_K$ is connected to the pressurized fluid supply unit 36.

The other end portion of each air tube 164 connected to a corresponding balloon 161 of a lock unit 155 on the rear side is connected to a third connecting member $R_3$. Connecting end portions $r_1$, $r_2$, and $r_3$ are formed on one end portion of the third connecting member $R_3$, and a common connecting portion $r_4$ connected to the connecting end portions $r_1$, $r_2$, and $r_3$ is formed on the other end portion of the third connecting member $R_3$. The other end portion of each of three air tubes 164 respectively connected to three balloons 161 of the lock unit 155 on the rear side is connected to a corresponding one of the connecting end portions $r_1$, $r_2$, and $r_3$ on one side of the third connecting member $R_3$.

One end portion of one common air tube $164_K$ is connected to the connecting end portion $r_4$ on the other side of the third connecting member $R_3$. The other end portion of the common air tube $164_K$ is connected to the pressurized fluid supply unit 36.

In the above-described arrangement, the other end portion of each of the three air tubes 150 respectively connected to the three elastic actuators 144 of the moving unit 141 is connected to the first connecting member $R_1$, the other end portion of each of the three air tubes 16 respectively connected to the three balloons 161 of the lock unit 154 on the front side is connected to the second connecting member $R_2$, and the other end portion of each of the three air tubes 164 respectively connected to the three balloons 16 of the lock unit 155 on the rear side is connected to the third connecting member $R_3$. In addition, the first, second, and third connecting members $R_1$, $R_2$, and $R_3$ are connected to the pressurized fluid supply unit 36 through the common air tubes $150_K$, $164_K$, and $164_K$, respectively. Therefore, the number of air tubes to be connected to the pressurized fluid supply unit 36 can be reduced in comparison with the case wherein the other end portion of each of the three air tubes 150 respectively connected to the elastic actuators 144 of the moving unit 141, the other end portion of each of the three air tubes 164 respectively connected to the balloons 161 of the lock unit 154 on the front side, and the other end portion of each of the three air tubes 164 respectively connected to the balloons 161 of the lock unit 155 on the rear side are connected to the pressurized fluid supply unit 36. For this reason, the load in forward and backward movement operations of the moving unit 141 can be reduced.

FIGS. 40 and 41 show the twelfth embodiment of the present invention.

In the twelfth embodiment, the connecting means between the lock units 154 and 155 and the frames 142 and 143 of the moving unit 141 in the seventh embodiment is modified. In this embodiment, recesses 200 are formed at three positions of the outer surface of each of frames 142 and 143 of a moving unit 141. A push button 201 and a spring member 202 are attached to each recess 200. The spring member 202 biases the push button 201 in the direction to urge it outward.

Communicating holes 203 communicating with the respective recesses 200 are formed in the connecting surfaces between the frames 142 and 143 and the lock units 154 and 155.

An engaging pawl portion 204 is formed on the push button 201 to extend toward each lock unit 154 (155). This engaging pawl portion 204 extends toward each lock unit 154 (155) through a corresponding one of the communicating holes 203 of each of the frames 142 and 143.

Pawl portion insertion holes 205 and engaging portions 206 for locking pawls 204a on the distal ends of the engaging pawl portions 204 are formed in and on the lock units 154 and 155 at positions corresponding to the communicating holes 203 of the frames 142 and 143.

In a state wherein these lock units 154 and 155 are connected to the frames 142 and 143 of the moving unit 141, the engaging pawl portions 204 on the side of the three push buttons 201 of the frames 142 and 143 are inserted in the pawl portion insertion holes 205 of the lock units 154 and 155, and the pawls 204a of the engaging pawl portions 204 are engaged with the engaging portion 206 formed deep in the pawl portion insertion holes 205 and are held therein, as shown in FIG. 41.

When the three push buttons 201 of the frames 142 and 143 are simultaneously depressed to disengage the engaging pawl portions 204 of the push buttons 201 from the lock units 154 and 155, the lock units 154 and 155 can be easily separated from the frames 142 and 143 of the moving unit 141.

In the above-described arrangement, attachment/detachment of the frames 142 and 143 of the moving unit 141 to/from the lock units 154 and 155 can be facilitated. In addition, since the three push buttons 201 are formed on each of the frames 142 and 143, even if one of the push buttons 201 is depressed by an external force or the like during travel of the moving unit 141, accidental removal of the lock units 154 and 155 from the frames 142 and 143 of the moving unit 141 can be prevented.

The present invention is not limited to the above described embodiments. Various changes and modifications can be made within the spirit and scope of the invention.

What is claimed is:

1. An intra-tube traveling apparatus comprising:

a moving unit to which test means for testing an interior portion of a pipe is held, the interior portion of the pipe defining a pipe-path along which the moving unit is movable, the moving unit being self-driven to travel along the pipe path; and movement control means for controlling movement of said moving unit;

said moving unit including:

elastic actuating means which is elastically deformable in a radial direction of the pipe path and which is extendable and contractible in an axial direction of the pipe along the pipe path upon reception of a pressurized fluid by the elastic actuating means;

first and second lock means respectively attached to first and second end portions of said elastic actuator means, the first and second lock means respectively having balloon-like elastic members;

each of the first and second lock means being expandable and deformable in the radial direction of the pipe path upon reception of the pressurized fluid therein to lock the moving unit to an inner surface of the pipe along the pipe path; and said movement control means including:

pressurized fluid supplying means for supplying the pressurized fluid to the first and second lock means and to the elastic actuator means of said moving unit;

first and second solenoid valves, the first solenoid valve being connected between the pressurized fluid supplying means and one of the first and second lock means, and the second solenoid valve being connected between the pressurized fluid supplying means and the other of the first and second lock means;

switching control means for switching and controlling a supply state of the pressurized fluid from said pressurized fluid supplying means to said first and second lock means and to the said elastic actuator means, for switching and controlling a discharge state of the pressurized fluid from the first and second lock means and from the elastic actuator means, and for thereby causing said moving unit to move forward or backward;

stop signal output means, connected to the switching control means, for outputting a stop signal for stopping a movement of the moving unit along the pipe path;

a stop control circuit for selectively switching the first and second solenoid valves, thereby to supply the pressurized fluid to at least one of the first and second lock means; and unit fixing means for supplying the pressurized fluid to at least one of the first and second lock means upon reception of the stop signal from the stop signal output means to expand and deform the first and second lock means to thereby lock the moving unit to the inner surface of the pipe along the pipe path.

2. An apparatus according to claim 1, wherein said switching control means comprises:

reducing valves for holding a pressure of the pressurized fluid supplied from said pressurized fluid supplying means to said solenoid valves to be constant;

said stop signal output means includes a stop switch, having a contact, for outputting the stop signal upon operation of the contact; and said unit fixing means comprises a stop control circuit for switching said solenoid valves respectively connected to said first and second lock means to supply pressurized fluid to said lock means when the stop signal is input from said stop switch.

3. An apparatus according to claim 1, wherein:

said unit fixing means includes movement inhibiting means for inhibiting a movement of said moving unit to stop said moving unit upon reception by said movement inhibiting means of the stop signal from said stop signal output means; and said movement inhibiting means supplying the pressurized fluid to at lest one of said first and second lock means upon reception of the stop signal from said stop signal output means, to expand and deform said at least one lock means to bring said at least one lock means into contact with the inner surface of the pipe along the pipe path, and causing an expandable and deformable portion of said at least one lock means and the inner surface of the pipe along said pipe path to be frictionally engaged with each other, thereby stopping movement of said moving unit.

4. An apparatus according to claim 3, wherein said movement inhibiting means includes means for supplying the pressurized fluid to said first and second lock means for expanding and deforming said lock means to bring at least one of said lock means into contact with the inner surface of the pipe along said pipe path, and for causing the expandable and deformable portions of said at least one lock means and the inner surface of the pipe along said pipe path to be frictionally engaged with each other, thereby stopping movement of said moving unit.

5. An apparatus according to claim 3, wherein:

said movement inhibiting means includes means for supplying the pressurized fluid to one of the first and second lock means upon reception of the stop signal from said stop signal output means, to expand and deform said one lock means to bring said one lock means into frictional contact with the inner surface of the pipe along said pipe path;

the pressurized fluid being discharged from said elastic actuator means, after said pressurized fluid causes the expandable and deformable portion of said one lock means and the inner surface of the pipe along said pipe path to be frictionally engaged with each other; and said movement inhibiting means further including means for supplying the pressurized fluid to the other of said first and second lock means, to expand and deform said expandable and deformable portion of said other lock means to bring said other lock means into contact with the inner surface of the pipe along said pipe path, and for causing the expandable and deformable portion of said other lock means and the inner surface of the pipe path to be frictionally engaged with each other, thereby stopping movement of said moving unit.

6. An apparatus according to claim 1, wherein:

said elastic actuator means comprises a cylindrical elastic actuator extending along the axial direction of the pipe path, the cylindrical elastic actuator having first and second end portions respectively connected to the first and second lock means, the cylindrical elastic actuator being elastically deformable in the radial direction of the pipe path and being simultaneously extendable and contractible in the axial direction of the pipe path upon reception of the pressurized fluid therein;

frames, respectively arranged on the first and second end portions of the cylindrical elastic actuator, for respectively holding said first and second lock means; and a holding portion on at least one of said frames for holding said test means of said moving unit.

7. An apparatus according to claim 6, wherein: said elastic actuator is contractible in the radial direction of the pipe path and is simultaneously extendable in the axial direction of the pipe path upon reception of the pressurized fluid therein.

8. An apparatus according to claim 6, wherein: said elastic actuator is expandable in the radial direction of the pipe path and is simultaneously contractible in the axial direction of the pipe path upon reception of the pressurized fluid therein, and sad moving unit includes a biasing member, arranged between said frames, for generating a biasing force in a direction to separate said frames from each other.

9. An apparatus according to claim 8, wherein:

said first lock means is arranged on a front side of said moving unit when viewed in a forward direction, and the second of said lock means is arranged on a rear side of said moving unit when viewed in the forward direction; and said holding portion for holding said test means on at least one of said frames, being positioned adjacent to said second lock means on the rear side of said moving unit.

10. An apparatus according to claim 9, wherein a distal end portion of said test means held by said holding portion extends to a position in front of a frame holding the first lock means.

11. An apparatus according to claim 8, wherein:

said elastic actuator means includes a plurality of elastic actuators arranged around said test means between said frames, to be parallel to the axial direction of the pipe path; and said biasing member includes a plurality of coil springs equal in number to the plurality of elastic actuators, said plurality of elastic actuators respectively being arranged in coils of said plurality of coil springs.

12. An apparatus according to claim 6, wherein said elastic actuator means includes a plurality of elastic actuators arranged around said test means between said frames to be parallel to the axial direction of the pipe path.

13. An apparatus according to claim 12, wherein said moving unit includes one coil spring having a plurality of coils, arranged between said frames, for generating a biasing force which acts to oppose the axial extension and contraction of at least one of said plurality of elastic actuators, said plurality of elastic actuators being arranged in a coil of said coil spring.

14. An apparatus according to claim 12, wherein the first lock means is arranged on a front end portion of said moving unit when viewed in a forward moving direction of the moving unit, and the second of said lock means is arranged on a rear end portion of said moving unit when viewed in the forward moving direction of the moving:

said moving unit further comprising:

a substantially coil-like winding portion having winding tubes for connecting both said second lock means on the rear side of said moving unit and said elastic actuators to said pressurized fluid supplying means; and another tube;

said another tube and said test means for connecting said second lock means to said pressurized fluid supplying means, being insertable in said coil-like winding portion of the moving unit.

15. An apparatus according to claim 12, wherein:

said first lock means is arranged on a front end portion of said moving unit when viewed in a forward moving direction, and the second of said lock means is arranged on a rear end portion of said moving unit when viewed in the forward direction;

said moving unit further comprising:

a substantially coil-like winding portion formed by winding one tube for connecting said first lock means to said pressurized fluid supplying means; and tubes for connecting said second lock means and said elastic actuators to said pressurized fluid supplying means, said test means being insertable in said coil-like winding portion.

16. An apparatus according to claim 12, wherein a plurality of elastic actuator means are connected to said moving unit along the axis of the pipe path.

17. An apparatus according to claim 16, wherein a given elastic actuator on a first end portion o said elastic actuator means is arranged at a position shifted from an axis on which another elastic actuator on a second end portion of said elastic actuator means is positioned; and further comprising a separate tube connected to the pressurized fluid supplying means to supply and discharge the pressurized fluid to and from each of the given and the another elastic actuators, each of said separate tubes being located on an axis which is the same as the axis of the elastic actuator of said elastic actuator means to which said tube is connected.

18. An apparatus according to claim 12, further comprising a connecting member including a plurality of connecting end portions respectively connected to said elastic actuators, and a common connecting end portion connected to said pressurized fluid supply means.

19. An apparatus according to claim 6, wherein said moving unit includes:

connecting means for detachably connecting said first and second lock means to said frames; and said first and second lock means respectively including a plurality of exchange units for selectively and detachably connecting said locking units to said frames through said connecting means, portions of said exchange units, which are brought into contact with the inner surface of the pipe along said pipe path when said exchange units are expanded and deformed, having different outer diameters, and one of said exchange units, which is selected in accordance with an inner diameter of the pipe path into which said moving unit is insertable, being connected to one of said frames.

20. An apparatus according to claim 19, wherein:

each of said exchange units comprises a unit frame, and a unit body having a plurality of balloon-like elastic member arranged around said unit frame; and each of said plurality of balloon-like elastic members respectively being arranged on said unit body to be substantially equidistant from a center of said unit frame.

21. An apparatus according to claim 20, wherein each of said exchange units includes means for separately controlling a supply and a discharge of the pressurized fluid to and from said plurality of balloon-like elastic members.

22. An apparatus according to claim 20, further comprising:
- a first connecting member including a plurality of connecting end portions respectively connected to said elastic actuator means, and a common connecting end portion connected to said pressurized fluid supplying means;
- a second connecting member including a plurality of connecting end portions respectively connected to said balloon-like elastic members of said exchange unit on a front end portion of said moving unit when viewed in a forward moving direction of said moving unit, and a common connecting end portion connected to said plurality of connecting end portions and to said pressurized fluid supplying means; and
- a third connecting member including a plurality of connecting end portions respectively connected to said balloon-like elastic members of said exchange unit on a rear end portion of said moving unit when viewed in the forward moving direction of said moving unit, and a common connecting member connected to said plurality of connecting end portions commonly connected to said pressurized fluid supplying means.

23. An endoscope system for testing the interior of a pipe path, said endoscope system comprising:
- an endoscope having an inserting portion insertable in the pipe path;
- a light source connected to said endoscope, for emitting illumination light for use in said endoscope;
- a monitor for displaying an observation image detected by said endoscope;
- a moving unit to which the inserting portion of said endoscope is held and which is self-driven to travel along the pipe path; and
- an intra-tube traveling unit having movement control means for controlling movement of said moving unit;
- said moving unit including:
  - elastic actuating means which is elastically deformable in a radial direction of the pipe and is extendable and contractible in an axial direction of the pipe along the pipe path upon a reception of a pressurized fluid by the elastic actuating means;
  - first and second lock means respectively attached to a first and a second end portion of said elastic actuator means, the first and second lock means respectively having balloon-like elastic members;
  - each of the first and second lock means being expandable and deformable in the radial direction of the pipe path upon reception of the pressurized fluid therein to lock the moving unit to an inner surface of the pipe along the pipe path; and
- said movement control means including:
  - pressurized fluid supplying means for supplying the pressurized fluid to the first and second lock means and to the elastic actuator means of said moving unit;
  - first and second solenoid valves, the first solenoid valve being connected between the pressurized fluid supplying means and one of the first and second lock means, and the second solenoid valve being connected between the pressurized fluid supplying means and the other of the first and second lock means;
  - switching control means for switching and controlling a supply state of the pressurized fluid from said pressurized fluid supplying means to said first and second lock means and to the said elastic actuator means, for switching and controlling a discharge state of the pressurized fluid from the first and second lock means and from the elastic actuator means, and for thereby causing said moving unit to move forward or backward;
  - stop signal output mans, connected to the switching control means, for outputting a stop signal for stopping a movement of the moving unit along the pipe path;
  - a stop control circuit for selectively switching the first and second solenoid valves, thereby to supply the pressurized fluid to at least one of the first and second lock means; and
  - unit fixing means for supplying the pressurized fluid to at least one of the first and second lock means upon reception of the stop signal from the stop signal output means to expand and deform the first and second lock means to thereby lock the moving unit to the inner surface of the pipe along the pipe path.

24. An intra-tube traveling apparatus comprising:
a moving unit to which test means for testing an interior portion of a pipe is held, the interior portion of the pipe defining a pipe-path along which the moving unit is movable, the moving unit being self-driven to travel along the pipe path; and
movement control means for controlling movement of said moving unit;
said moving unit including:
- elastic actuating means which is elastically deformable in a radial direction of the pipe path and which is extendable and contractible in an axial direction of the pipe along the pipe path upon reception of a pressurized fluid by the elastic actuating means;
- first and second lock means respectively attached to first and second end portion of said elastic actuator means, the first and second lock means respectively having balloon-like elastic members;
- each of the first and second lock means being radially expandable and deformable in the radial direction of the pipe path upon reception of the pressurized fluid therein to lock the moving unit to an inner surface of the pipe along the pipe path; and
said movement control means including:
- pressurized fluid supplying means for supplying the pressurized fluid to the first and second lock means and to the elastic actuator means of the moving unit;
- switching control means for switching and controlling a supply state of the pressurized fluid from said pressurized fluid supplying means to said first and second lock means and to the said elastic actuator means, for switching and controlling a discharge state of the pressurized fluid from the first and second lock means and from the elastic actuator means, and for thereby causing said moving unit to move forward or backward;

stop signal output means, connected to the switching control means, for outputting a stop signal for stopping a movement of the moving unit along the pipe path; and unit fixing means for supplying the pressurized fluid to at least one of the first and second lock means upon reception of the stop signal from the stop signal output means to expand and deform the first and second lock means to thereby lock the moving unit to the inner surface of the pipe along the pipe path;

wherein said switching control means comprises:

first and second solenoid valves respectively connected to said lock means and to said elastic actuator means; and reducing valves for holding a pressure of the pressurized fluid supplied from said pressurized fluid supplying means of said solenoid valves to be constant;

said stop signal output means including a stop switch, having a contact, for outputting the stop signal upon operation of the contact; and said unit fixing means comprises a stop control circuit for switching said solenoid valves to supply pressurized fluid to said lock means when the stop signal is input from said stop switch.

* * * * *

UNITED STATES PATENT AND TRADEMARK OFFICE
CERTIFICATE OF CORRECTION

PATENT NO. : 5,144,848
DATED : September 8, 1992
INVENTOR(S) : UENISHI et al It is certified that error appears in the above-identified patent and that said Letters Patent is hereby corrected as shown below:

TITLE PAGE

Section [73] Assignees -

Insert the following second Assignee:

--Bridgestone Corporation, Tokyo, Japan--.

Signed and Sealed this

Fifteenth Day of April, 1997

Attest:

BRUCE LEHMAN

Attesting Officer

Commissioner of Patents and Trademarks